(12) United States Patent
Park et al.

(10) Patent No.: US 10,271,599 B2
(45) Date of Patent: Apr. 30, 2019

(54) DOWN PRODUCT HAVING JOINING PATTERN LINE PRODUCED BY HIGH-FREQUENCY BONDING TECHNIQUE AND METHOD FOR MANUFACTURING SAME

(71) Applicants: Young Chul Park, Seoul (KR); Soo Han Chae, Seoul (KR)

(72) Inventors: Young Chul Park, Seoul (KR); Soo Han Chae, Seoul (KR)

(73) Assignees: Young Chul Park, Seoul (KR); Soo Han Chae, Seoul (KR)

( * ) Notice: Subject to any disclaimer, the term of this patent is extended or adjusted under 35 U.S.C. 154(b) by 0 days.

(21) Appl. No.: 15/507,761

(22) PCT Filed: Jul. 1, 2015

(86) PCT No.: PCT/KR2015/006776
§ 371 (c)(1),
(2) Date: Mar. 1, 2017

(87) PCT Pub. No.: WO2016/052839
PCT Pub. Date: Apr. 7, 2016

(65) Prior Publication Data
US 2017/0280802 A1    Oct. 5, 2017

(30) Foreign Application Priority Data
Oct. 1, 2014  (KR) .................. 10-2014-0132528

(51) Int. Cl.
*A41D 3/00*      (2006.01)
*A41D 5/00*      (2006.01)
(Continued)

(52) U.S. Cl.
CPC .............. *A41H 43/04* (2013.01); *A41D 3/00* (2013.01); *A41D 5/00* (2013.01); *A41D 27/245* (2013.01);
(Continued)

(58) Field of Classification Search
CPC ..... B29C 66/71; B29C 65/04; B29C 65/4815; B29C 65/4835; B29C 65/526;
(Continued)

(56) References Cited

U.S. PATENT DOCUMENTS 3,528,874 A * 9/1970 Spencer ............. A41D 31/0038
156/279
3,530,030 A * 9/1970 Adams .................. D21H 19/24
15/104.93
(Continued)

FOREIGN PATENT DOCUMENTS

JP       3037948 B1    2/2000
JP    2000-328462 A1  11/2000
(Continued)

OTHER PUBLICATIONS

Written Opinion of WO2016052839.*
(Continued)

*Primary Examiner* — Sonya M Sengupta
(74) *Attorney, Agent, or Firm* — Haynes and Boone, LLP

(57) ABSTRACT

A process of manufacturing a down product comprises at least one bonding pattern line for the compartment separation without forming sewing holes by printing and drying a heat-reactive adhesive on the inner surface of an inner fabric, an optional mesh material and/or an outer fabric in a predetermined pattern, laminating said inner fabric, optional mesh material and/or outer fabric, and then high-frequency heating them under pressing with a pressing pattern the same as the printing pattern to bond the inner fabric, optional (Continued)

mesh material and outer fabric. Accordingly, it is possible to manufacture a down product having a bonding pattern line composed of a bonding line with excellent adhesiveness and durability and an aesthetically excellent pattern line with good clearness and finishing quality as well as to achieve a mass production of down products by mechanization and automation.

23 Claims, 17 Drawing Sheets

(51) Int. Cl.
| A41D 27/24 | (2006.01) |
|---|---|
| A41D 31/00 | (2019.01) |
| A41H 41/00 | (2006.01) |
| A41H 43/04 | (2006.01) |
| B29C 65/00 | (2006.01) |
| B29C 65/04 | (2006.01) |
| B29C 65/48 | (2006.01) |
| B29C 65/52 | (2006.01) |
| B29C 65/62 | (2006.01) |
| B29C 65/72 | (2006.01) |
| B29C 65/82 | (2006.01) |
| B29K 27/18 | (2006.01) |
| B29K 67/00 | (2006.01) |
| B29K 75/00 | (2006.01) |
| B29K 77/00 | (2006.01) |
| B29L 31/48 | (2006.01) |
| B32B 37/00 | (2006.01) |
| B32B 37/06 | (2006.01) |
| B32B 37/12 | (2006.01) |

(52) U.S. Cl.
CPC ......... *A41D 31/0038* (2013.01); *A41H 41/00* (2013.01); *B29C 65/04* (2013.01); *B29C 65/4835* (2013.01); *B29C 65/526* (2013.01); *B29C 65/72* (2013.01); *B29C 65/8215* (2013.01); *B29C 66/1122* (2013.01); *B29C 66/221* (2013.01); *B29C 66/43* (2013.01); *B29C 66/729* (2013.01); *B29C 66/81427* (2013.01); *B29C 66/8322* (2013.01); *B32B 37/0053* (2013.01); *B32B 37/06* (2013.01); *B32B 37/1292* (2013.01); *B29C 65/4815* (2013.01); *B29C 65/62* (2013.01); *B29C 66/71* (2013.01); *B29C 66/81431* (2013.01); *B29C 66/949* (2013.01); *B29L 2031/4842* (2013.01); *B32B 2305/18* (2013.01); *B32B 2307/304* (2013.01); *B32B 2437/00* (2013.01)

(58) Field of Classification Search
CPC ..... B29C 65/62; B29C 65/72; B29C 65/8215; B29C 66/1122; B29C 66/221; B29C 66/43; B29C 66/729; B29C 66/81427; B29C 66/81431; B29C 66/8322; B29C 66/949; B29K 2027/18; B29K 2067/00; B29K 2075/00; B29K 2077/00; B29L 2031/4842; A41D 27/245; A41D 31/0038; A41D 3/00; A41D 5/00; A41H 41/00; A41H 43/04; B32B 2305/18; B32B 2307/304; B32B 2437/00; B32B 37/1292
USPC ...... 156/272.2, 275.5, 275.7, 290, 291, 235, 156/277; 2/69, 458, 93; 5/502
See application file for complete search history.

(56) References Cited

U.S. PATENT DOCUMENTS

| 4,096,016 | A | * | 6/1978 | Pohl | B29C 44/5636 |
|---|---|---|---|---|---|
| | | | | | 156/272.2 |
| 5,244,716 | A | * | 9/1993 | Thornton | A41B 11/005 |
| | | | | | 428/198 |
| 5,939,166 | A | * | 8/1999 | Cheng | B29C 65/086 |
| | | | | | 428/92 |
| 6,564,387 | B1 | * | 5/2003 | Willoughby | A41D 13/0537 |
| | | | | | 2/69 |
| 6,960,734 | B1 | | 11/2005 | Park | |
| 2011/0041232 | A1 | * | 2/2011 | Covelli | A41F 9/00 |
| | | | | | 2/69 |
| 2011/0048645 | A1 | * | 3/2011 | Nakata | A41H 43/04 |
| | | | | | 156/380.6 |
| 2017/0280802 | A1 | * | 10/2017 | Park | A41H 41/00 |
| 2017/0282528 | A1 | * | 10/2017 | Park | D03D 11/00 |

FOREIGN PATENT DOCUMENTS

| KR | 20-0277834 B1 | 6/2002 |
|---|---|---|
| KR | 2002-0069430 A1 | 9/2002 |
| KR | 2002-0085570 A1 | 11/2002 |
| KR | 10-0405319 B1 | 11/2003 |
| KR | 10-0479428 B1 | 3/2005 |
| KR | 20-0376062 A1 | 3/2005 |
| KR | 10-2006-0022001 A1 | 3/2006 |
| KR | 20-0434829 B1 | 12/2006 |
| KR | 10-0826093 B1 | 4/2008 |
| KR | 10-0835612 B1 | 5/2008 |
| KR | 10-0906407 B1 | 6/2009 |
| KR | 10-0911881 B1 | 8/2009 |
| KR | 10-2009-0126881 A1 | 12/2009 |
| KR | 10-2005-0002729 A1 | 1/2010 |
| KR | 10-0970777 B1 | 7/2010 |
| KR | 10-2011-0116426 A1 | 10/2011 |
| KR | 10-1075134 B1 | 10/2011 |
| KR | 10-1183671 B1 | 9/2012 |
| KR | 10-1454001 A1 | 10/2014 |
| KR | 10-1509449 B1 | 4/2015 |
| WO | 2012115413 A1 | 9/2012 |
| WO | 2016052839 A1 | 4/2016 |

OTHER PUBLICATIONS

Translation of KR100835612.*
Translation of KR20020069340.*
Translation of KR20120100566.*
English Translation of International Search Report dated Sep. 20, 2012 for PCT/KR2012/001261.
English Translation of Written Opinion dated Sep. 20, 2012 for PCT/KR2012/001261.
English Translation of International Search Report dated Oct. 1, 2015 for PCT/KR2015/006776.
English Translation of Written Opinion dated Oct. 1, 2015 for PCT/KR2015/006776.

* cited by examiner

| Examined Items | Fabric Type | Washing Test (10 Times) | Washing Test (20 Times) | Washing Test (30 Times) |
|---|---|---|---|---|
| Washing test (Washing 40 min., Drying 40 min.) | (a) Gore Breathable Fabric | | | |
| | (b) Normal Breathable Fabric | | | |
| | (c) Stretch Breathable Fabric | | | |
| | | | | |
| Separation at linked portions | | None | None | None |

FIG. 15

DOWN PRODUCT HAVING JOINING PATTERN LINE PRODUCED BY HIGH-FREQUENCY BONDING TECHNIQUE AND METHOD FOR MANUFACTURING SAME

PRIORITY CLAIM

This application is a 371 national stage application of International Patent Application No. PCT/KR2015/006776 filed Jul. 1, 2015, which claims priority to Korean Patent Application No. KR 10-2014-0132528 filed Oct. 1, 2014, which are incorporated herein by reference in their entirety as part of the present disclosure.

TECHNICAL FIELD

Embodiments of the present invention relate to a method for the preparation of down products having bonding pattern lines for forming a compartment by a high-frequency bonding technique, and down products prepared by the method. More specifically some embodiments of the present invention relates to a method for the preparation of down products in which bonding lines for forming a compartment are formed on the inner surfaces of the fabrics and pattern lines are formed on the surface of the fabrics, which comprises printing an adhesive on an inner fabric and/or an outer fabric in a predetermined printing pattern, drying the adhesive, laminating the inner fabric and the outer fabric, and heating and pressing the fabrics by means of a high-frequency bonding technique to bond the fabrics, and down products prepared by the same.

BACKGROUND ART

Down products filled with insulating materials such as duck down or goose down are used not only for cold weather clothing and bedding, but recently they are also getting lots of attention and well sought after as products for outdoor clothing or the like.

As to clothing or bedding products prepared by filling a wadding material between an outer fabric and an inner fabric, the filled wadding material may generate phenomena such as getting lumpy, moving around, getting stacked or the like while manufacturing or utilizing the products, which may cause various inconveniences. In a case that the wadding material is a fabric such as a cloth, the above phenomena can be prevented by fixing the edge of the wadding material to the edge of the product. In a case that the wadding material is a continuous material such as cotton or wool, the wadding material can be prevented from moving or getting lumpy by sewing the inner fabric and outer fabric together with the wadding material therebetween by backstitching or quilting.

In a case that the wadding material is a non-continuous material such as duck feathers or goose feathers, it is difficult to fix the wadding material by backstitching or quilting, but it is possible to prevent the wadding material from moving or getting lumpy by making separate rooms such as compartments between the inner fabric and the outer fabric.

A down compartment is generally formed by connecting an inner fabric and an outer fabric with combining or bonding lines for separating compartments, and the compartments (rooms) formed by the inner fabric, the outer fabric and the combining lines are filled with down (down feather). In a down jacket, sewing line compartment walls are formed at a certain interval by sewing the inner fabric together with the outer fabric, and then the opened ends of the inner fabric and outer fabric are subjected to an overlock finishing to form spatially closed down compartments.

Down products having one or more separated down compartments as above can prevent down from moving around or moving back, but still have other problems such as coming out of down and an introduction of moisture through the fabric itself, coming out of down and an introduction of moisture through sewing holes or needle holes, and an increase of manufacturing cost due to the sewing process for forming down compartments.

The coming out of down through the fabric itself can be prevented relatively easily by employing a down-proof processed fabric or a coated or laminated functional fabric. Functional fabrics such as a moisture-permeable waterproof fabric or a breathable fabric are prepared by a surface processing, a film coating or a multi-layer structuring, and can prevent the coming of down and the introduction of moisture through the fabric itself. Further, they can prevent a phenomenon that the down gets damp and a generation of bad smell due to the introduced moisture.

In order to prevent down from coming out and an introduction of moisture through sewing holes or needle holes, there have been proposed an intercalation sewing method wherein the sewing holes are closed by inserting an intercalation fabric or adhesion band between an inner fabric and an outer fabric and sewing them, a sewing-line sealing method wherein the coming out of down and introduction of moisture through the sewing holes is prevented by covering the sewing line with another fabric and then adhering/fusing its end parts to seal the sewing line, and a seamless bonding method wherein the fabrics are not sewn but combined by an adhering method or a fusing method.

Korean Patent Application No. 10-2004-0102619 suggested an intercalation sewing method wherein a fabric tape is intercalated along a sewing line. This document has disclosed that the coming out of duck feathers through needle holes of a sewing line could be prevented by an inserting process for placing a fabric tape along the (intended) sewing line and a sewing process along the inserted fabric tape. However, the inserting process and the sewing process are difficult to be mechanized and are a time- and manpower-consuming process, which makes the manufacturing cost high and a mass production difficult. In addition, after a long-term use, the fabric tape may lose its adhesiveness and then be separated from the inner fabric or outer fabric, thereby causing duck feathers to come out again through the needle holes of the sewing line. Further, it may be necessary to perform an additional step for fixing or pre-adhering the fabric tape so that it does not move during work.

Korean Patent Application Nos. 10-2009-0036839 and 10-2009-0036840 suggested an intercalation sewing method wherein a hot melt is intercalated along the sewing line. This document has disclosed that the coming out of duck feathers through the needle holes of the sewing line can be prevented by an inserting process for placing a hot melt band or belt along the (intended) sewing line and a sewing process along the inserted hot melt. However, the inserting process and the sewing process are difficult to be mechanized and are a time- and manpower-consuming process, which makes the manufacturing cost high and a mass-production difficult. In addition, after a long-term use, the hot melt may lose its adhesiveness and then be separated from the inner fabric or outer fabric, thereby causing duck feathers to come out again through the needle holes of the sewing line. Further, it may be necessary to perform an additional step for fixing or pre-adhering the hot melt so that it does not move during work.

Korean Patent Application No. 10-2007-0110839 discloses a seamless (or non-sewing) bonding method wherein an inner fabric and an outer fabric are bonded with a hot melt film with a specific pattern, and the space between said patterns is utilized as down compartments. The technology of this document has been suggested in order to solve the problems of prior art (e.g., Korean Patent Application No. 2004-0102619) wherein a plurality of down compartments are prepared by forming down compartment separation lines at a certain interval in the lateral direction by a sewing or a fabric tape. This document discloses that it is possible to utilize, as down compartment which can prevent the movement or sagging of duck feathers, a space formed with a hot melt film having a specific design. Said spaces can be separately divided by inserting and pre-adhering the hot melt film having a shape such as a specific diagram, letter or logo between an inner fabric and an outer fabric and fusing the inner fabric and the outer fabric by a hot-pressing. As the hot melt adhesive, mention can be made on a heat melt adhesive, which exists in a solid phase and stays in solid state without being dissolved or dispersed in a solvent at room temperature, but melts and changes into liquid upon receiving a certain amount of heat, thereby being able to adhere instantly. In this prior art technology, a hot melt film can increase the adhesion area as compared to a hot melt band or belt, and thus the adhesiveness can be increased. However, since fabrics are bonded by hot-pressing the heat melt adhesive, there are still problems that the pattern line finishing is not clear and thus the aesthetic value is low, and the fabric may get separated from the adhesive after a long-term use or a repeated use and/or during washing due to lack of adhesiveness durability.

Korean Patent Application No. 10-2010-0020559 discloses a seamless bonding method wherein a bonding line for compartment separation is formed by hot-fusing the surface of a fabric. This document discloses that, first, an inner fabric and an outer fabric are cut to give pattern pieces and the resulting pattern pieces are sewed at their edges to make a clothes piece where edges of the inner fabric and the outer fabric are combined but down compartments are not formed, and second, the space between the inner fabric and outer fabric of the clothes piece mentioned above is filled with down (duck feathers) and then the clothes piece is subjected to a hot fusion to form a bonding line for compartment separation while blowing compressed air so that duck feathers are not placed on the intended bonding line for compartment separation. However, the process of dividing or splitting the filled duck feathers into both sides of the intended bonding line and the process of blowing the compressed air so that duck feathers are not placed on the intended bonding line, etc. are complex, time- and man-power-consuming, and difficult to be mechanized, which makes difficult a mass production of down products. In addition, it is difficult to achieve an even distribution of down and the uniformity of down compartments, and therefore, the above method is difficult to be applied to actual production.

Korean Patent Application No. 10-2011-0015144 (PCT/KR2012/001261) discloses a seamless bonding method wherein a bonding line for compartment separation is formed by a hot-fusion of a fabric coating. This document discloses a down jacket and its preparation, wherein a urethane coating layer is formed on both of the inner surface of an inner fabric and the inner surface of an outer fabric which are made of a spandex material, and then compartments are formed by fusing the urethane coating layer of the inner surfaces along a bonding line without sewing. The fusing method of fabric coating, including the fusing method of the fabric itself, has fundamental problems that the fabric may be damaged and there is a limitation in the fabric that can be applied (i.e., limited to a fabric or fabric coating that can be fused). In addition, since fusing itself is a type of a melt-bonding of a copolymer resin, not a bonding by polymerization or graft, it has the same problem as a hot melt bonding method mentioned above. That is, there are problems that the pattern line finishing is not clear and thus the aesthetic value is low, and the fabric may get separated from the adhesive after a long-term use or a repeated use and/or during washing due to lack of adhesiveness durability.

Korean Utility Model Application No. 20-2006-0022001 discloses a seamless bonding method wherein a bonding line for compartment separation is formed by using an adhesive. This document suggests a method for preparing duck feather clothing wherein a double fabric is firstly prepared by introducing an adhesive in a wave shape between the inner fabric and outer fabric to form a wave-shaped adhesive part, and then the double fabric is cut and sewed in a desired shape. This document also describes that it is possible to prevent the loss of duck feathers through needle holes because an inner fabric and an outer fabric are bonded by an adhesive, and it is possible to prevent the duck feathers from moving back or from getting lumpy in the compartments divided by the wave-shaped adhesives. This prior art technology does not use a curing-reactive adhesive, but uses a solvent-dissolved solid adhesive, which is a melting-heat type adhesive such as hot melt. Thus, this prior art technology, like the hot melt bonding method mentioned in the above, still has problems that the pattern line finishing is not clear and thus the aesthetic value is low, and the fabric may get separated from the adhesive during long-term or repeated use and/or washing due to lack of adhesiveness durability.

Korean Patent Application No. 10-2011-0019556 also discloses a seamless bonding method wherein a bonding line for compartment separation is formed by using an adhesive. However, this document only describes that a common adhesive is employed as the adhesive and the adhesive is heat-treated to achieve the bonding, but does not have any detailed description concerning the type of adhesives and the bonding method.

Korean Patent Application No. 10-2011-0116426 discloses a sewing line closing method wherein the end parts of functional fabric such as moisture-permeable waterproof fabric is finished by using a seam sealing tape. This document describes that a sewing wrinkle generation phenomenon generated upon sewing and a coating face slip phenomenon of the moisture-permeable waterproof fabric due to a sewing needle can be solved by closing the sewing line of the end part of the fabric with the seam sealing tape, and that their tensile strength and waterproof performance are good. When closing and finishing the sewing line for compartment separation with the seam sealing tape according to the sewing line closing method, it is also possible to prevent an introduction of moisture through the sewing holes.

It is difficult to find prior art documents which disclose a sewing line closing method. However, many manufacturing companies prevent the introduction of moisture through sewing holes by closing the sewing line and the overlock finishing area by means of such a sewing line closing method. For example, there are attempts to prevent down from coming out by covering and closing the sewing line or the overlock finishing area with a fabric having the same color after manufacturing the down product by means of a sewing method (e.g. W.L. Gore & Associates). However, even this method has a problem that an additional process for closing the sewing line is required in addition to the sewing process for forming a compartment line.

In addition, in order to prevent the leaking of duck feathers and the entering of rainwater through the sewing holes, there are disclosed a method for closing the sewing holes by sewing using a melting thread and heat-fusing the melting thread (Korean Patent Application No. 10-2009-0126881), a technology of fusing with an ultrasonic fuser and finishing with a seam sealing tape (Korean Patent Application No. 10-2009-0126881), and the like.

Meanwhile, a new quilting method using a high-frequency heating has been suggested. For example, Japanese Patent Laid-Open No. 2000-328462 discloses a technology of inlaying a quilting pattern on the surface by introducing a curing-reactive liquid adhesive via an injection needle between an inner fabric and an outer fabric, and bonding the inner fabric, the intermediate layer and the outer fabric together by a high-frequency heating and pressing. This document discloses that, by high-frequency heating and pressing the curing-reactive liquid adhesive introduced into the intermediate layer, the fabric and the intermediate layer are press-bonded at the inside, and a pattern of a pressing tip is inlaid on the surface. However, since the liquid adhesive introduced into the inside can spread around during the pressing, the adhesion condition of the inside would vary and cannot be uniform. Thus, the finishing of the adhering line would be very poor and uneven. Further, the needle holes created when introducing the adhesive may be the cause of damage to the fabric and a penetration of moisture.

Meanwhile, in the field of manufacturing down products, the problems that down gets lumpy and moves around can be solved to some extent by forming compartments, whereas the additional sewing process for forming such compartments is manpower- and time-consuming and thus causes another problem that the process cost increases. Further, there is a problem that the sewing process is difficult to be mechanized and thus mass production of down products is difficult.

As a seamless bonding method that does not go through a manpower- and time-consuming sewing process, there have been suggested a bonding method using an adhesive and a fusing method by a fabric fusing. However, such bonding method and fusing method are also difficult to be mechanized, and thus became a manpower- and time-consuming process. Further, due to damage to the fabrics by a fabric fusing or the like, a limitation in selecting fabrics, and a lack of adhesive strength and durability with the heat-melting adhesion method, there have been limitations in putting these methods to practical use at actual manufacturing places.

Under such circumstances, research has continued to develop a method to form a compartment separation line between an inner fabric and an outer fabric by using an adhesive so as to cause no problem in adhesiveness, adhesiveness durability and adhering line finishing.

SUMMARY OF THE INVENTION

Technical Subject

In order to avoid sewing holes through which duck down may come out and rainwater may enter, there have been suggested various methods for forming down compartment separation lines by a seamless method such as a fusing method or an adhering method, but in these methods, the compartment separation line lacks adhesiveness and durability and the pattern line on the fabric surface is not clear or its finishing quality is bad, and thereby, the methods have problems in aesthetic, practicality and economic feasibility. In order to solve the above problems and disadvantages of prior art technology, as a result of research and development the embodiments of the present invention provide a method for forming bonding pattern lines for compartment separation and a method for the preparation of down products using the same, wherein the bonding lines for compartment separation on the inner surfaces of the fabrics have an excellent adhesiveness and durability, and the pattern lines on the fabric surface are clear and their finishing quality is excellent, and thus is aesthetically excellent.

Means for Achieving the Subject

Embodiments of the present invention make it possible to manufacture down products in which a bonding pattern line for compartment separation is formed, without forming sewing holes and without causing any damage to the fabric, by printing a heat-reactive adhesive liquid on the inner surface of an inner fabric and/or an outer fabric in a predetermined printing pattern, drying it, laminating the inner fabric and the outer fabric, and then high-frequency heating them under compression in a pressing pattern coinciding with the printing pattern to bond the inner fabric and outer fabric with the adhesive liquid, wherein the inner bonding line has an excellent adhesiveness and durability, the surface pattern line is clear and its finishing quality is excellent, and the inner bonding line and surface pattern line are unified as an identical pattern.

Further, embodiments of the present invention makes it possible to establish a base for economical mass production of down products by developing and commercializing a manufacturing method based on a pre-bonding post-cutting manner, which firstly manufactures a double fabric in which bonding pattern lines for compartment separation are formed, and then subjects it to a cutting process and post-processes to prepare a down product.

Effect of the Invention

According to some embodiments of the present invention, because it employs a high-frequency bonding method using a heat-reactive adhesive and/or a pre-bonding post-cutting manner wherein a double fabric is firstly prepared by forming a compartment separation line and then subjected to a cutting, it is possible not only to manufacture a down product having a bonding pattern line composed of a bonding line with an excellent adhesiveness and durability, and a pattern line with aesthetical excellency due to its clearness and good finishing quality, but also to mass produce down products by mechanization and automation.

BRIEF DESCRIPTION OF THE DRAWINGS

FIG. 15 is a drawing illustrating the result of a washing test on a clothes piece of a down product filled with down wherein bonding pattern lines for compartment separation are formed by the high frequency bonding technique.

EMBODIMENTS FOR CARRYING OUT THE INVENTION

Figure 1:
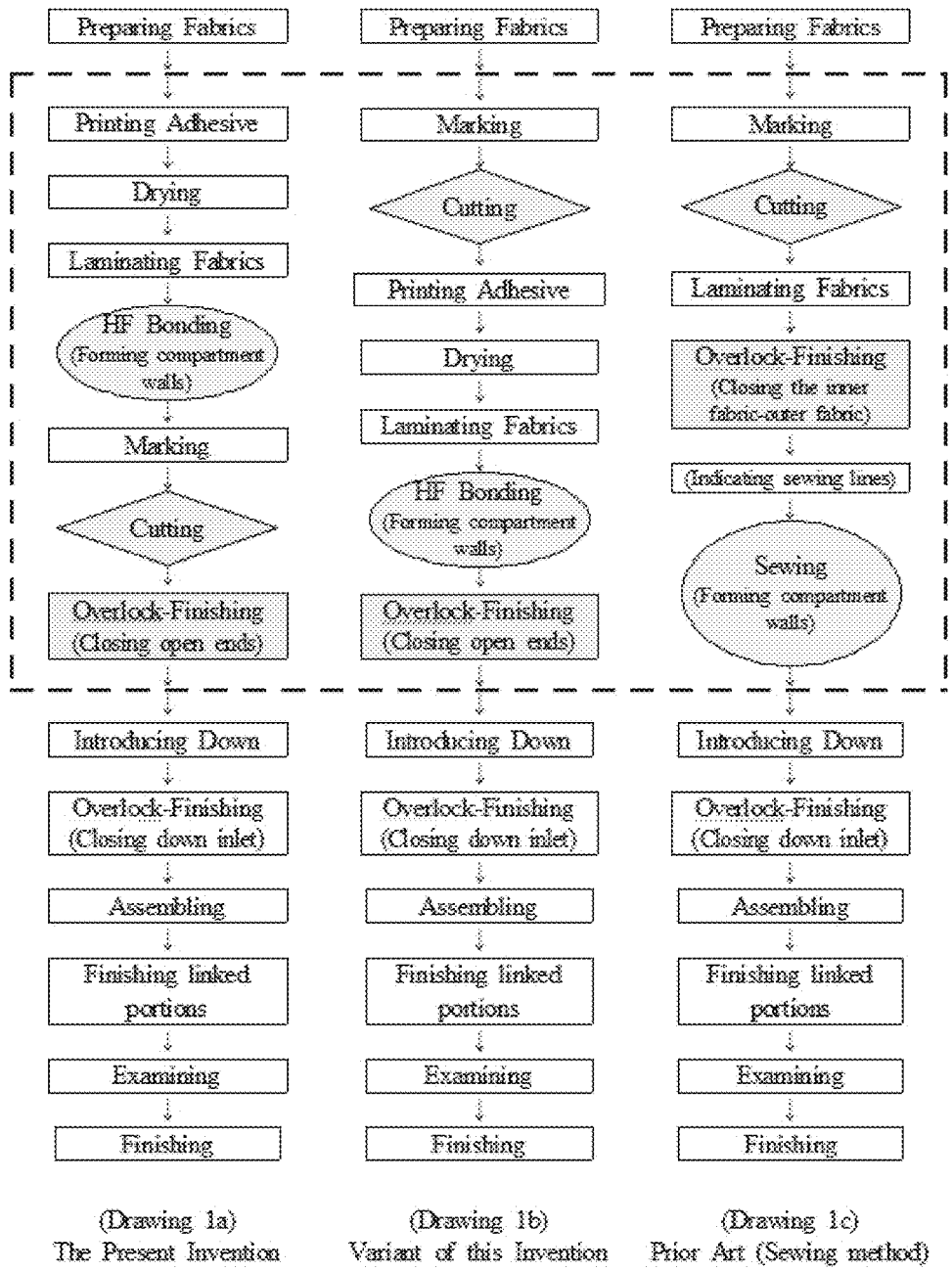
FIG. 1 is a drawing illustrating the order for manufacturing a down product with compartments; the drawings (a) and (b) illustrate a flow chart of the pre-bonding post-cutting manner and a flow chart of the pro-cutting post-bonding manner according to the high frequency bonding technique of the present invention, respectively, and the drawing (c) illustrates a flow chart of the pre-cutting post-bonding manner according to the sewing method of prior art.

The first purpose of the some of the embodiments of the present invention is to provide a down product comprising at least one bonding pattern line for compartment separation which is composed of an inner bonding line formed between an inner fabric and an outer fabric and a surface pattern line formed on the outer surface of the inner fabric or the outer fabric, characterized in that:

said inner bonding line is formed on the inner surfaces of the inner fabric and the outer fabric by fixing a heat-reactive adhesive on the surface of the inner or outer fabric in a predetermined printing pattern, high-frequency heating and curing said fixed adhesive, and thus combining said fabrics with the reacted and cured adhesive, said surface pattern line is formed on the surface of the outer fabric by pressing said inner fabric and outer fabric together in a predetermined pressing pattern under the high-frequency heating to cause a difference in surface texture, the inner bonding line from said printing line and the surface pattern line from said pressing pattern are the same in pattern (shape) and have a width difference of 10% or less, and said surface pattern line is substantially unified with the inner bonding line by the adhesive oozed onto or near to the surface of the outer fabric and then cured, or optionally, a reinforced material is additionally inserted between the inner fabric and the outer fabric in a continuous manner between adjacent pattern bonding lines or in a discontinuous manner around pattern bonding lines.

The second purpose of the present some embodiments of the invention are to provide a method of manufacturing a down product in which at least one bonding pattern line for compartment separation is formed by bonding an adhesive with a high-frequency between an inner fabric and an outer fabric, comprising:

(1) a preparing step of preparing an inner fabric and an outer fabric, (2) a printing step of printing a heat-reactive liquid adhesive in a predetermined printing pattern on the inner surface of the inner fabric or on the inner surface of the outer fabric, (3) a drying step of drying the liquid adhesive printed on the inner surface of the inner fabric or on the inner surface of the outer fabric, (4) a laminating step of laminating the inner fabric and the outer fabric, and (5) a high-frequency bonding step of high-frequency heating and simultaneously pressing both the laminated inner and outer fabrics in a pressing pattern which is the same pattern as said printing pattern to form the bonding pattern line.

According to a variant of the present invention, a reinforced material can be optionally inserted between an inner fabric and an outer fabric, and said reinforced material can be inserted in a continuous manner between the adjacent pattern bonding lines or in a discontinuous manner near to or around each of the pattern bonding lines.

The third purpose of the some of the embodiments of the present invention is to provide a double fabric for down products, comprising at least one bonding pattern line for compartment separation which is composed of an inner bonding line formed between an inner fabric and an outer fabric and a surface pattern line formed on the outer surface of the inner fabric or the outer fabric, and a reinforced material can be optionally intercalated between an inner fabric and an outer fabric.

According to one embodiment of the present invention, at the printing step (2) above, a liquid adhesive is printed in the same printing pattern on an inner fabric and an outer fabric, at the drying step (3), the printed liquid adhesive is dried, and at the laminating step (4), the inner fabric and the outer fabric are laminated so that the printing pattern of the inner fabric coincides with the printing pattern of the outer fabric.

The printing step (2) can be carried out by applying or printing a heat-reactive adhesive by a common printing technology, and an example of the printing technology can include a stamping printing technology, a pressing press printing technology, a roller printing technology or a screen printing technology. Said printing pattern has a width of 1~20 mm, specifically 2~15 mm, preferably 3~10 mm, and may be printed in one or more lines at an interval of 5~30 cm.

As the heat-reactive adhesive, it is possible to employ, without limitation, any type of adhesive that can react by heating to exhibit an adhesion power (or adhesiveness), and a non-limited example thereof can include an epoxy-type adhesive. Such adhesive can further contain a curing agent, a diluent and/or a retardant in an amount of 5~15% w/w.

In the present invention, said liquid adhesive is preferably a type that is liquid at a room temperature or can be liquefied with a solvent or the like. The liquid adhesive or the liquefied adhesive may have a viscosity of 1~500 mPa·s, specifically 5~300 mPa·s, preferably 10~200 mPa·s, depending on its printing convenience.

According to one embodiment of the present invention, the step (3) of drying an adhesive can be carried out to an extent that the adhesive is not transferred even when an inner fabric and an outer fabric come into contact with each other or are rubbed against each other, which can be achieved, for example, by carrying out the drying at a temperature of 50~100° C. and for 1 min~60 min.

According to an embodiment of the present invention, in the laminating step (4) of laminating an outer fabric and an inner fabric, it is necessary to adjust the position of the fabrics to coincide their printing patterns with each other. This step of adjusting the position of the fabrics may comprise a step of measuring the location of the fabric or location of the printing pattern and a step of adjusting the location of fabrics or the delivery speed of fabrics. In a case that the adhesive is printed only on one fabric, because a predetermined intended adhering line may exist even on a fabric where the adhesive is not printed, the step of adjusting the position may be necessary in order to coincide the printing pattern with the intended adhering line.

The high-frequency bonding step (5) according to the present invention may be carried out by heating under high frequency and simultaneously pressing the fabrics on which the adhesive is attached or printed in a predetermined printing patter that is the same pattern as the printing pattern. Such pressing and high frequency heating can be simultaneously carried out by using, for example, a high-frequency pressing roller or press in which a protrusion (or pressing tip) with a pressing pattern is formed.

According to another embodiment of the present invention, said high-frequency bonding is carried out with a dielectric heating method or an induction heating method by using a ultrasonic or high-frequency wave of 7 KHz~400 KHz for 1~30 seconds.

According to an embodiment of the present invention, the method of the present invention may further comprise the following steps:

(6) a step of marking on the double fabric obtained in step (5) and cutting it into pattern pieces, (7) a step of performing an overlock finishing (closing the compartment opening) of the pattern pieces, (8) a step of introducing down into the compartment, and then closing the down inlet to give a clothes piece, and (9) a step of combining clothes pieces.

Hereinafter, some embodiments of the present invention are explained in more detail.

The terms used in the specification of the present invention are as follows:

The terms "sewing line," "adhering line" and "fusing line" respectively mean an area in a linear form or belt form wherein an inner fabric and an outer fabric are bonded physically or chemically by a sewing, a bonding with an adhesive, and a fusing of the fabric surface, and all of which can be referred to as "combining line". In some cases, they can be referred to as a sewing combining line, a fusing combining line or an adhering combining line. The term "bonding line" means "a combining line" wherein an inner fabric and an outer fabric are physically or chemically connected by a manner such as fusing, adhering or the like, but excludes a sewing line.

The term "intended combining line" or "combining-intended line" does not mean a physical or actual combining line, but an imaginary or virtual region or range where a combining line is to be located. In some cases, its location or region may be indicated with ink, dye or the like on a fabric surface. The term "intended sewing line" and "intended adhering line" also have a similar meaning.

The term "pattern line" means a pattern of a linear or belt shape that can be visibly recognized on a fabric surface due to the difference in surface texture or the difference in microstructure of the surface (minute surface structure), which can be formed permanently or semi-permanently on the pressed side of the fabric surface at the time of heating and pressing the fabric. Examples of a pattern line may include a hot-pressed pattern formed permanently or semi-permanently on the fabric surface, a sewing line pattern seen on the fabric surface, and a pattern formed by an adhesive oozing out to the fabric surface, etc. According to a sewing method, the combining line on the inner surfaces is the same as a pattern line on the surface, but according to a fusing method, the combining line (i.e., fusing line) on the inner surfaces of the fabrics may be different from the pattern line on the fabric surface. When hot pressing the fabric surface, a surface pattern line may be formed even without forming an inner bonding line.

The term "inner fabric material" and "outer fabric material" have substantially the same meanings as "inner fabric"

and "outer fabric", but the term "inner fabric material" may be used to refer to fabric before being cut, and the term "inner fabric" may be used to refer to fabric after being cut.

The term "down" means duck down or goose down, which refers to breast feathers of duck or goose, but it is generally used to have a broad meaning covering duck feathers and goose feathers. Further, it may refer to materials that can partly or fully replace them, such as other insulating material or wadding material.

Hereinafter, important features and processing steps of the present invention are explained in detail.

1. Fabric

There is no particular limitation in the fabric that can be used in the present invention, and it is possible to use all of general fabrics, down-proof fabrics and functional fabrics. An inner fabric and an outer fabric may be the same or different.

General fabric means a common fabric made of natural fiber and/or synthetic fiber, and for example, mention can be made of cotton fabric, satin (silk) fabric, linen fabric, wool fabric, nylon fabric, polyester fabric, polyester/wool fabric, T/C (Teflon-coating) fabric, oxford fabric, suede fabric, felt fabric, Jacquard fabric, fiber or yarn-dyed fabric, piece-dyed fabric, or the like. However, such general fabric is not widely used as inner fabric or outer fabric for down products.

Down-proof fabric means fabrics that have been processed or manufactured in a special way to be suitable to fill with fluffs, feathers or down, and generally refers to all fabrics that have been processed or down-proof processed so that down does not leak or escape outside.

Down-proof processing refers to a process carried out so that down does not escape outside the fabric. It is possible to use a method of making a fabric itself in high density or low denier during the fabric weaving process, or a post-processing method of melting and filling up the loose texture of a fabric.

For example, fabric with a higher ventilation (air-permeability) can better show the characteristics of down, but if the gap between threads is not dense, down can come out through the gap. Therefore, a special processing, such as a processing that can give a down feather-penetrating resistance to a fabric woven in high density, would be carried out as a down-proof processing. Specifically, it is possible to weave 100% cotton, T/C (mixed yarn of polyester-cotton), ultra fine fiber, Gore-Tex or the like in a very high density so that feathers or the like do not escape, and then to carry out a processing wherein the strands are pressed down by applying a strong pressure with a calendar.

Functional fabric is a fabric provided with functions such as waterproof property, moisture permeability, air permeability or the like by means of film, coating or the like. All breathable coating fabrics are a functional fabric. For example, mention can be made of Gore fabric, Hyvent fabric and all functional fabrics manufactured by Kolon, Shinhan, or the like. Such functional fabric itself may be considered as a down proof fabric.

The purpose of coating on a fiber or fabric is to provide a special performance (function) or a change in appearance (sensitivity or feeling) to the fiber or fabric. Thus, it is important to suitably select a resin, a coating method and an equipment and to firmly adhere the resin to the fiber to unify the resin-fiber, so that a fiber or fabric base into which a resin liquid easily penetrates and which can be easily deformed by an external stress has a proper resin thickness and a uniform coating membrane without damaging the flexibility and the property of the fiber itself.

A conventional waterproof fabric is prepared by subjecting a base fabric to a coating or laminating process with a rubber or acryl resin to prevent rain, water or the like from penetrating from outside, thereby to provide the base fabric with a complete waterproof. However, it has a problem of giving displeasure while being worn because it has no permeability and thus does not release sweat, vapor, heat, or the like. The breathable coating of functional fabric recently developed is a coating that has been suggested in order to solve this problem of conventional waterproof cover.

In general, a breathable functional fabric can be manufactured by two methods, i.e., one is to prepare Gore-Tex by laminating a fluorine resin film onto a fabric and anther is to create minute pores by coating polyurethane on a fabric. Comparing the above two fabrics, the fabric manufactured by a film adhesion method has a more excellent performance than a fabric manufactured by a coating method, and said two fabrics also show a great difference in waterproof performance and durability. Thus, recent breathable fabrics are manufactured mostly by a film adhesion method.

However, functional fabrics may cause bad smell because rainwater cannot be easily discharged once introduced through the sewing holes. Thus, in case of processing by a sewing method, it is necessary to close or seal the sewing holes. The absorption of rainwater through sewing holes and bad smell caused therefrom are very severe problems, such that taping the sewing line is an obligation as a sales condition in the case of Gore-Tex.

As a non-limited example of the breathable functional fabric being sold in the market, mention can be made on Gore-Tex (W.L. Gore & Associates product), Proact (Hyosung T&C product, a polyurethane resin film, a wet-type laminating method), HiPora (Kolon product, a polyurethane coating), Hill-Tex (Hopehill product, using a resin film), High Flex (New World product; using Hytrel which is a moisture-permeable waterproof polyester elastomer resin of Dupont), Entrant (Japan Toray, coating a polyurethane resin liquid directly on a fabric), or the like.

In general, down products employ a down-proof fabric or a functional fabric as an outer fabric and a down-proof fabric as an inner fabric. Preferably, a functional fabric is used as an outer fabric and a down-proof fabric is used as an inner fabric.

2. Adhesive

According to the present invention, the adhesive can be used in the form of a liquid adhesive (hereinafter, also referred to as "adhesive liquid") which is in liquid phase at room temperature or processing temperature and can be changed into solid or semi-solid phase by drying. The liquid adhesive (or adhesive liquid) can sufficiently permeate into an inner fabric or an outer fabric, and can be heat-cured during a high frequency heating to firmly bond the inner fabric and outer fabric.

An adhesive that is solid at room temperature or processing temperature can be employed in the form of an adhesive liquid or adhesive composition after being dissolved in a solvent. The adhesive can be applied in a liquid state during its application and can be fixed in a semi-solid or solid state on a fabric surface by removing of the solvent by drying. Since the adhesive is dried, it is not transferred or stained onto others, or its applied pattern not changed, when the fabrics come into contact together or are rubbed against each other during the laminating step.

In general, as an adhesive for adhering a fiber or a fabric, mention can be made on a heat-melting type adhesive, a solvent-volatilizing type adhesive, or a chemical-reaction type adhesive.

The heat-melting type adhesive is a type of adhesive that is solid at room temperature and can be melted by heating and then solidified by cooling for adhesion. It typically includes a hot melt adhesive, and specifically includes, for example, a polyamide resin, a polyolefin resin, a polyester resin, or the like.

The solvent-volatilizing type adhesive is a type of adhesive that is solid at room temperature and can be dissolved in a solvent and then solidified by volatilizing the solvent for adhesion. For example, mention can be made on an organic solvent-soluble adhesive (e.g., chloroprene, urethane resin), a water-soluble adhesive (e.g., polyvinyl alcohol) and a water-dispersible adhesive (e.g., polyvinyl acetate, polyacrylic emulsion).

The chemical-reaction type adhesive is a type of adhesive that can exert adhesion by chemical reactions such as polymerization, condensation, grafting or the like. Specifically, it can be classified into a one-liquid type adhesive that can initiate a chemical reaction by heat, light or the like, and a two-liquids type adhesive which can initiate a chemical reaction by a mixture of components. The one-liquid type chemical-reaction adhesive can be exemplified by a heat-curing adhesive (e.g., epoxy resin), a moisture-curing adhesive (e.g., silicone resin), a UV-curing adhesive (acryl oligomer resin), and the two-liquid type chemical reaction adhesive can be exemplified by a condensation reaction adhesive (urea type), an additive reaction adhesive (epoxy resin), a radical polymerization adhesive (acryl oligomer).

In the present invention, it is preferable to employ a high-frequency heat bonding adhesive as an adhesive. The "high-frequency heat bonding adhesive" is not a type particularly restricted or sold separately, but refers to any heat-reactive adhesive showing adhesion by reaction when heated by an external energy source such as heat, high frequency or the like. Specifically, mention can be made of a heat-curing adhesive such as an epoxy-type adhesive, an acryl-type adhesive and a urethane-type adhesive. In some cases, the heat-reactive adhesive may form a chemical bonding with a fabric and/or a substance coated on the fabric by a polymerization, a condensation or a grafting, and in this case, the adhesion quality can be further improved.

According to the present invention, an adhesive is heat-reacted or heat-cured by a high frequency heating or the like to bond fabrics. It is preferable to employ an adhesive that can provide a product that can maintain the flexibility of fabrics even after proceeding the reaction.

There is no particular limitation in the solvent which can be used for the adhesive composition or adhesive liquid according to the present invention as far as it can be easily volatilized or removed when necessary, does not deform the fabric, and does not cause a bad effect on the fabric. A non-restrictive example of the solvent that can be used can be exemplified by alcohols (methanol, ethanol, propanol, butanol, etc.), esters (methyl acetate, ethyl acetate, etc.), ethers (dimethyl ether, diethyl ether), ketones (acetone, methylethylketone), aliphatic hydrocarbons (pentane, hexane, hexane, cyclopentane, cyclohexane, etc.), aromatic hydrocarbons (benzene, toluene, etc.), halogenated hydrocarbons (chloroform, dichloroethane), or the like. An adhesive generally sold may contain a solvent or solvate, and such solvent or solvate may also be deemed as the above solvent.

There is no particular limitation in the amount or ratio of solvent used in an adhesive liquid or adhesive composition. It can be properly, optionally selected during the process by a person having ordinary skill in the art, so that the solvent can have a viscosity that enables an adhesive liquid to be used in a roller printing or screen printing process. The viscosity of the adhesive liquid is not critical and can be selected commonly from the range of 0.1~1000 mPa·s, particularly from the range of 1~500 mPa·s, preferably from the range of 2~100 mPa·s, and more preferably from the range of 3~50 mPa·s. If the viscosity of the adhesive liquid is too high, it may not permeate into a fabric or cannot bond well to a fabric surface.

According to one embodiment of the present invention, the adhesive composition or adhesive liquid may be a mixture of a heat-reactive adhesive (a heat-curable adhesive) and a solvent, and can further contain a diluent, a curing agent (a curing promoter) and an optional retardant.

In the adhesive composition mentioned above, the content or ratio of each component is not particularly limited and can be properly adjusted according to the process conditions. For example, in an adhesive composition, the adhesive and solvent can be contained in a ratio of 80~99% w/w and preferably in a ratio of 85~95% w/w. And the solvent can be selected from 50% w/w or less, preferably from 30% w/w or less, and more preferably from 10% w/w or less based on the weight of the adhesive. Even in such case, it is preferable to adjust the viscosity of the adhesive liquid within the above range, particularly within the range of 1~500 mPa·s. In an adhesive composition, the curing agent, diluent and retardant can each be used in an amount of 1~10% w/w, and preferably in an amount of 2~7% w/w. If necessary, the solvent, diluent, retardant or the like may not be used. For example, a retardant may not be added into an adhesive composition when the adhesive composition is printed by a screen printing process.

According to one preferable variant of the present invention, the adhesive composition may comprise a pigment or dye in an amount of 1~20% w/w. There is no particular limitation in the types of the pigment and dye that can be employed, but it is advisable to employ a type which is not decolored or deformed during a high-frequency heating, or which can be colored or deformed as intended.

Meanwhile, the heat-reactive adhesive can be a reactive monomer, a polymer having a reactive group or a mixture thereof, and can be used in the form of a composition comprising a thermosetting curing agent for initiating or promoting the curing by heat.

In addition to a heat-reactive adhesive, the adhesive composition according to the present invention may contain other types of adhesives, if necessary, and it is possible to contain, for example, a heat-melting adhesive and/or solvent-volatilizing adhesive, for example, up to an amount of 50% by weight.

2-1. Epoxy-type Adhesive

As a heat-reactive adhesive, it is possible to use an epoxy-type adhesive. The curing of an epoxy-type resin can be carried out generally at a temperature of 10~40° C. for a room temperature curing, at a temperature of 60~100° C. for an intermediate temperature curing, and at a temperature of 140° C. or higher for a high temperature curing, and the curing time can be varied from a couple of hours to 24 hours or more. Therefore, it is possible to adjust the curing speed by using a curing promoter or a curing retardant, if necessary.

In general, terminal groups which can promote a curing can be exemplified by —OH, —COOH, —SO$_3$H, —CONH$_2$, —CONHR, —SO$_3$NH$_2$, SO$_3$NHR or the like and terminal groups which can retard a curing can be exemplified by —OR, —COOR, —SO$_3$R, —CONR$_2$, —CO, —CN, —NO$_2$ (wherein R is an alkyl group having 1~6 carbon atoms, but is not particularly limited thereto), or the like.

As curing promoters (i.e., curing agents), amine and acid are mainly used. Examples of amine-curing promoters can include phenols such as phenol, cresol, nonylphenol, bisphenol-A or the like, DMP-30, polymercaptans, and examples of acid-curing promoters can include benzyl methyl amine, DMP-30, pyridine, K-61B, Lewis acids, Lewis bases.

In general, as an amine-curing promote, it is preferable to use compounds having —OH group such as phenol and alkyl phenol, tertiary amines or the like, and as promoters for fast curing at a low temperature, it is preferable to use compounds having —SH group such as mercaptans.

The main purpose of diluents is to lower the viscosity by being added to an epoxy-type resin or a curing agent. It plays a role that improves the properties of flowing and defoaming during use or improves the ability of a penetration, or a role that enables a filler to be effectively introduced. In general, different from solvents, the diluents are not volatile, but remain in a cured product during a resin-curing process. Diluents can be classified into a reactive diluent and a non-reactive diluent. Here, the reactive diluents have one or more epoxy groups and participate in the reaction to enter a cured product in a cross-linking structure, and the non-reactive diluents are only physically mixed and dispersed within a cured product.

Since reactive diluents may decrease the mechanical, thermal, chemical or electrical properties of a cured product, it would be preferable to use a diluent having one functional group only when used for the purpose of reducing a viscosity. By using a multifunctional diluent, it is possible to prevent the deterioration of the properties to a certain extent. Reactive diluents that are generally widely used can be exemplified by butyl glycidyl ether (BGE), phenyl glycidyl ether (PGE), aliphatic glycidyl ether (C$_{12}$~C$_{14}$), modified tert-carboxyl diglycidyl ester, and various others.

Non-reactive diluents should be compatible with epoxy resin or curing agent and should be non-volatile and have low viscosity. Also, since they are not chemically bonded in a cured product, they could ooze out to the surface when excessively used, and thus the amount of diluent to be used should be determined after sufficient experiments. Non-reactive diluents generally used can be exemplified by dibutyl phthalate (DBP), dioctyl phthalate (DOP), nonylphenol, Hysol, and various others. When selecting diluents, it is necessary to consider the purpose of use and the properties of resin component. For the use of a general civil engineering field, BGE is mainly used, and in a field requiring said properties such as molding, impregnating or the like, PGE (phenyl glycidyl ether), CGE (cresyl glycidyl ether), SO (for high-sealing) or the like are used rather than BGE.

Diluents give a diluting effect as well as greatly affect the change in curing properties of the resin required in addition to the diluting effect. When selecting a diluent, it would be necessary to consider a diluting effect, an effect on properties of a cured product, a safety, an economic feasibility or the like. There are not many cases where a non-reactive diluent or a reactive diluent is used alone, and there is little case where the non-reactive diluent and reactive diluent are mixed together. Generally, 2~3 types of reactive diluents are used together.

2-2. Resin-type Adhesive

As a high-frequency heat bonding adhesive, it is possible to mention the following resin-type heat-reactive adhesives in addition to synthetic heat-reactive adhesives:

Heat curing adhesives: a urea-type adhesive, a melamine-type adhesive, a phenol-type adhesive, an unsaturated polyester-type adhesive, an epoxy-type adhesive, a resorcinol-type adhesive;

Thermoplastic adhesives: a polyvinyl acetate-type adhesive, a polyvinyl alcohol-type adhesive, a vinyl chloride-type adhesive, a polyvinyl acetal-type adhesive, an acryl-type adhesive, a saturated polyester-type adhesive, a polyamide-type adhesive, a polyethylene-type adhesive;

Rubber-styrene type adhesives: a butadiene rubber-type adhesive, a nitrile rubber-type adhesive, a butyl rubber-type adhesive, a silicone rubber-type adhesive, chloroprene.

As adhesives for a high-frequency heat bonding, mention can be made of mixed adhesives as follows:

Mixed-phenol type: a vinylic phenol-chloroprene rubber type;

Epoxy type: a polyamide type, a nitrile rubber-epoxy type.

As an adhesive of the present invention, it is possible to use a heat curing adhesive and mention can be made of an adhesive made of a vinyl acetate type resin, a nitro cellulose type resin, an epoxy type resin and a phenol type resin, preferably of an adhesives made of an epoxy-type resin and a phenol-type resin.

As an adhesive of the present invention, it is possible to use SGA (a second generation adhesive) which is a generic term for a reactive-acryl type adhesive. It is possible for it to exhibit good adhesion having an excellent heat resistance, a chemical resistance and the like, by a graft polymerization of the elastic body and acryl monomer in the mixed composition during the curing reaction.

It may be preferable to use a rapid reactive adhesive which can exert adhesiveness immediately.

3. Printing of Adhesives

The liquid adhesive or adhesive composition can be printed or coated on a fabric by a general printing technology such as a stamping printing technology, a pressing press printing technology, a roller printing technology or a screen printing technology. In the printing or dyeing field, minute or micro patterns can be formed with 2~4 colors. A printing or dyeing technology can be applied to the present invention without any difficulty, treating the liquid adhesive like a sort of ink.

There is no particular restriction in the printing pattern to be formed or carved on the stamp, press, roller and screen. The pattern can preferably be a pattern wherein a straight line, a curved line, a broken line (---), a tilde or wave line (~~~) or a zigzag line is formed in at least one line, specifically one or two lines. In case that a printing pattern is formed with two or more lines, it would be preferable for the entire width of the pattern not to exceed the maximum width of the printing pattern of the adhesive liquid mentioned below.

The adhesive liquid is applied or printed on the surfaces of the inner fabric and outer fabric facing and contacting each other (hereinafter, "inner surface"). For example, the adhesive liquid is coated or printed on the inner surface of the inner fabric or on the inner surface of the outer fabric, or on both of them.

In case of using functional fabrics as an outer fabric, the adhesive liquid may be printed only on the inner surface of an inner fabric (or down back) without printing on the inner surface of the functional fabric that is an outer fabric. Also, when a common down-proof fabric is used for both of the outer fabric and inner fabric (or down back), the adhesive liquid may be printed on both of the inner surfaces of the inner fabric and outer fabric.

The width of a printing pattern may be narrowed to 0.5 mm at the smallest, but from the point of view of the adhesiveness strength of an adhering line and the process efficiency (cost/performance), the width can be selected from at least 1 mm, preferably at least 2 mm, and specially at least 3 mm. The upper limit of the range of pattern width is not important for a printing pattern, but when considering the purpose of the present invention to form a compartment separation line with a combination of an inner bonding line and a surface pattern line, the upper limit can be selected from 20 mm or less, preferably 10 mm or less, and specially 8 mm or less. The width of a printing pattern can be efficiently selected from the range of 3~8 mm. The width of the printing pattern even exceeding 20 mm can be applied to the present invention without causing any big problems, but when considering the characteristics of down products, a compartment separation line having a width of 20 mm or larger may cause problems to down products in keeping warmth or in appearance when they are worn.

There is no particular restriction in the interval between the adjacent bonding lines for compartment separation, i.e., interval of the printing patterns printed on a fabric. As for clothing, the interval can be selected from 3~30 cm, particularly from 4~25 cm, and preferably from 5~20 cm. As for bedding, the interval can be selected from 5~50 cm, particularly from 10~40 cm, and preferably 15~30 cm. The interval can be increased or decreased, if necessary.

There is no particular restriction in the ratio of the area printed or coated by an adhesive or the area occupied by the printing pattern with respect to the total area of the fabric or clothing. Considering the purpose for forming the compartment separation line, the ratio would be selected from 20% or less, particularly 15% or less, preferably 10% or less, and more preferably 5% or less.

4. Drying of Adhesive

When a bonding pattern line for compartment separation is formed by a high-frequency bonding, a process of drying an adhesive liquid may be important or critical. The drying of the adhesive liquid printed on a fabric is necessary because it stops the adhesive liquid from oozing out or getting stained or transferred onto others when the fabrics overlap each other or get contacted and rubbed against each other during the laminating process.

Further, when the fluidity of an adhesive liquid melted during a high frequency heating is too high, the adhesion power may be insufficient or the finishing of the adhering line may be poor. Thus, it is necessary to dry an adhesive liquid to a suitable level. Specifically, when a dried adhesive liquid is melted and cured at a high temperature while pressed with a high-frequency heat roller or press, a low dryness level of the adhesive liquid may make the fluidity of the adhesive liquid too high, and as a result, the adhesive liquid may excessively spread out or be squeezed outside, which may result in an insufficient amount of adhesive liquid for forming the bonding line. In addition, the adhesive liquid which spreads out too far away from the range of the high frequency heating may not proceed with the curing reaction during a high frequency bonding, and will cause the down feather to get lumpy in the compartments, causing its curing to proceed slowly when the down product is in use so as to get the down tangled up.

The dryness level of an adhesive liquid attached or printed onto a fabric is not critical. Drying may be performed to an extent that the adhesive liquid does not flow out while delivering the fabric, and does not ooze out while laminating the fabrics, or to an extent that some adhesive liquid is not stuck on your finger after you have softly rubbed it with your finger.

There is no particular restriction in a drying temperature and a drying time, and they can be properly selected according to the type and concentration of an adhesive liquid and a solvent. For example, the temperature can be selected from the range of 50~250° C., particularly 70~200° C., and preferably 100~150° C., and the drying time can be selected from the range of 1~60 min, particularly 1~40 min, and preferably 2~20 min. Preferably, drying can be performed by using warm air or hot air having the above temperature, or with a tenter dryer.

The thickness of the adhesive (excluding the adhesive permeated into the fabric) attached or printed on the fabric after drying is 1 mm or less, preferably 0.5 mm or less, and more preferably 0.3 mm or less. If the thickness of the adhesive gets too thick, the remaining adhesive liquid may flow over or spread over the pattern line and deteriorate the finishing quality during a high frequency heat pressing, or the thickness of the pattern line may become too thick, so that the compartment surface may not become flush with the pattern line.

According to another preferable embodiment of the present invention, the process for drying the adhesive liquid may be performed until the viscosity of the bonded adhesive liquid is at least 100 mPa·s, particularly at least 500 mPa·s, and preferably at least 1000 mPa·s, although it can vary depending on the viscosity of the adhesive. In an attached adhesive liquid, the solvent on or near the surface can be removed more quickly than the solvent in the inside. Therefore, when a semi-solid film is formed on the surface, it is possible to conclude that the adhesive liquid is dried to an extent that it does not ooze out when the fabrics are rubbed together. Thus, the viscosity may refer to the viscosity of the surface of the attached adhesive liquid, and preferably may refer to the average viscosity of the attached adhesive liquid.

5. Laminating of Fabrics

In the present invention, "lamination" of fabrics means simply stacking or overlapping an inner fabric and an outer fabric one on another, but excludes a chemical or physical combining. This is different from the general meaning of lamination that two or more fabrics are adhered or combined by methods such as bonding, laminating or the like. In the present invention, when an inner fabric and an outer fabric are stacked and then a part of them is combined by a bonding line, this is referred to as the term "double fabric," and when the fabrics are not combined but simply stacked one on top of another, it is referred to as "laminated fabric."

Thus, the lamination of fabrics refers to a state where an inner fabric and an outer fabric are stacked together to be in close contact, but the inner fabric and outer fabric are still not combined physically or chemically. In general, the lamination of fabrics can be performed by placing an outer fabric on an inner fabric.

In the laminating step of fabrics according to the present invention, it is necessary to bring an inner fabric in close contact with an outer fabric and simultaneously to make the printing pattern of the adhesive liquid of the inner surface of the inner fabric coincide with the printing pattern of the adhesive liquid of the outer fabric.

Other prior art for manufacturing a common down product would not comprise the process or idea of coinciding the printing patterns or pressing patterns, and thus the laminating step of fabrics is not a step posing a great difficulty.

However, in the present invention, it is a difficult step where the printing pattern lines and/or the intended combining lines of fabrics should be coincided with each other when closely contacting an inner fabric with an outer fabric. The laminating step of the present invention can be performed by controlling the moving speed of the fabrics or the roller rotating speed in consideration of swelling degree, tension or the like of the inner fabric and outer fabric. Occasionally, the moving speed of the fabric, the pattern location or the like can be measured and controlled using a laser measurer or the like.

Meanwhile, in a common sewing process, an inner fabric material and an outer fabric material are each separately cut to prepare inner fabric pieces and outer fabric pieces. The resulting inner fabric pieces are respectively laminated and combined with the corresponding outer fabric pieces. Therefore, the laminating process and the combining (sewing) process require manual work and thus are difficult to be mechanized, which also makes it difficult to achieve a mass production. Whereas, in the present invention wherein an adhesive liquid is printed with a printing technology and then a bonding pattern line is formed with a high-frequency bonding, it is easy to mechanize all the processes including the adhesive printing process, the drying process, the laminating process and the subsequent processes, which can make it possible to achieve a mass production of down products.

According to the present invention, the adhesive liquid is coated or printed by applying a printing process. Such printing process can also be applied in order to make the patterns of the adhesive coincide with each other in the laminating process of fabrics.

6. High Frequency Bonding (1) High-frequency Heating

Ultrasonic-frequency or high-frequency heating is largely divided into an induction heating and a dielectric heating depending on the physical property of the materials to be heated. The former is mainly used for heating conductive metals, and the latter is mainly used for heating materials with dielectric loss such as water, paper, plastic, etc.

Said heating can also be classified depending on the frequency of the heating power source as shown in the following Table 1. The frequency used for a high-frequency induction heating can be specifically classified into a low frequency (frequency used: 50~60 Hz), a middle frequency (100 Hz~10 KHz), a high frequency (10 KHz~500 KHz), and a radio frequency (100 KHz~500 KHz). In particular, the heating using a middle frequency, a high frequency or a radio frequency is referred to as a high-frequency heating.

TABLE 1

| Classification | Induction heating | Dielectric heating | Microwave heating |
|---|---|---|---|
| Substances to be heated | conductor (e.g. metal) semiconductor | insulator plastic wood, fiber | bad conductor (e.g. food, drug) |
| Frequency (Actual frequency) | 3 KHz~3 MHz (7 KHz~400 KHz) | 3 MHz~300 MHz (5 MHz~50 MHz) | 300 MHz~300 GHz (900 MHz~3 GHz) |
| Heating principle | Current loss heat by an induction | Friction heat by the dipolar motion of a molecule | Friction heat by the dipolar motion of a molecule |
| Distribution of heating temperature | Heated from the load surface | Heated from the load center | Heated from the load center |
| Heating electrode | coil type | condenser type | Irradiated by probe |
| Use | a heat treating of metals an applied brazing | a mold adhesion of wood a process of dried vinyls a drying of fiber | a food processing a drug drying |

The high frequency heating method of some embodiments of the present invention are not particularly restricted and can be selected from an induction heating using a high frequency of 3 KHz~800 KHz, particularly 7 KHz~400 KHz, or a dielectric frequency of 2 MHz~100 MHz, particularly 5 MHz~50 MHz. The high-frequency heating time may vary depending on the type and thickness of a fabric, the type of adhesive or the like, and can be selected from a range of 1~30 sec, specifically 2~20 sec, but is not limited thereto.

For example, a thin fabric which is not subjected to any coating treatment can be heated by irradiating a high frequency of about 15 KHz for 4~5 sec, a coated fabric can be heated by irradiating a high frequency of 30~40 KHz for 6~8 sec, and a thick fabric subjected to a film treatment or a laminating treatment can be heated by irradiating a high frequency of 60~80 KHz for about 10~12 sec, but these do not restrict the present invention.

The advantages of a high-frequency heating can include: 1) economic feasibility due to a direct heating of the object to be heated; 2) guarantee of a high quality due to a local heating and a selective heating; 3) possibility of mass production due to a quick processing in matter of seconds; and 4) prevention of pollution or damage due to a non-contact heating. In addition to the above advantages, mention can be made of other advantages such as material saving, non-pollution, improved operation efficiency, an efficient installation area.

Meanwhile, all materials can be largely classified into conductive materials and dielectric materials. Conductivity can be explained as follows. When electricity is applied to a material, it does not stay in a given area but moves to an area of lower voltage, but some materials have a resistance prohibiting such movement. If the resistance is low, the material is referred to as a conductive material or a conductor. On the contrary, if the resistance is high, the material is referred to as an insulator.

Dielectric property can be indicated as a permittivity, which is different from resistance. If indicated as an inherent resistance value, material used as a dielectric is a nonconductor where the inherent resistance is relatively high. Therefore, all materials can be classified into a conductor and a dielectric. Next, if the materials classified as above are matched to an object for a high frequency heating, a conductive material can be heated by an induction heating and a dielectric material can be heated by a dielectric heating using dipole vibration. Thus, as a result, all materials would be subject to a high frequency heating.

Further, an induction heating can be further classified, according to heating principle, into a heating due to hysteresis loss and a heating due to eddy current loss. Among the materials, magnetic substances can be heated using both of the above losses, but unfortunately, non-magnetic substances cannot be heated by hysteresis loss, and thus the heating efficiency is relatively low. In light of this, however, it is possible to use non-magnetic substances as a container for matters to be heated by a high frequency heating. In comparison with other methods such as electricity or fuel, a high frequency heating has the above advantages, and thus recently its is rapidly being extended to various fields.

(2) Pressing

According to the present invention, a bonding pattern line is formed by heating with a high-frequency the laminated inner fabric and outer fabric, curing the adhesive, and simultaneously pressing it to bond or integrate the inner fabric-adhesive-outer fabric. The inner fabric and outer fabric are laminated so that the patterns of the adhesive liquid printed thereon coincide with each other. Preferably, a high frequency heating and pressing is carried out by using a high frequency heating roller or press having a pressing tip with the same pattern as the printing pattern of the adhesive liquid. Specifically, it is preferable that the concave pattern (i.e., printing pattern) carved in the printing roller for an inner fabric or an outer fabric is substantially the same as the convex pattern (i.e., pressing pattern) formed on the high-frequency heating roller. Here, the expression that the patterns are the same can mean that not only the pattern shapes are the same but also the pattern widths are the same.

According to another embodiment of the present invention, the width of the pressing pattern of the pressing tip is substantially the same as the width of the intended bonding line or the width of the printing pattern of the adhesive. For example, the width difference or the shape disparity is within 20%, particularly within 10%, preferably within 5%, and more preferably within 1%. It is better for the pressing pattern to be smaller than the printing pattern.

After stacking an inner fabric (or down back) attached with an adhesive liquid by the printing technology on an outer fabric which is a breathable coating fabric, a pattern of a designated shape is formed by using a high frequency heating roller or press. The pattern of the pressing tip (i.e., the pressing pattern) which is protruded from the high frequency heating roller or press may be the same as or similar to the printing pattern carved on the main roller or screen used during the printing process of adhesive liquid. Like a breathable coating fabric, there are fabrics that cannot be fused using a high frequency heating. However, the present invention has an advantage that it is possible for the method to be applied even to these fabrics, since some embodiments of the present invention are practiced by carrying out a high frequency bonding and using an adhesive.

(3) High Frequency Bonding

In the high frequency bonding step (5), the pressing and high frequency heating are applied along the pressing pattern of the pressing tip of the roller or press for a high frequency bonding. Thus, the fabrics are heated and pressed along the pressing pattern, and thus the surface texture changes, and accordingly a pattern line is formed. However, the adhesive is heated with the high-frequency irradiation ray or a high-frequency heating ray projected along the pressing pattern to proceed with a curing reaction, and thereby to form a bonding line. As a result, a pattern line is formed by a change in surface texture occurring along the pressing pattern, and an adhering line is formed by the adhesive which has proceeded with a curing reaction along the pressing pattern. At this time, if the pressing pattern does not coincide with the printing pattern, in other words, if the pressing pattern and printing pattern are not the same, or if they were not coincided with each other during a laminating process even though they are the same, the adhesives present at locations different from the pressing pattern may not proceed with a curing reaction, and thus an adhering line may not be formed along the overall printing pattern, and may be formed only at portions overlapping or coinciding with the pressing pattern.

According to the present invention, the printing pattern and the pressing pattern are substantially the same. Also, since the pressing pattern of the pressing tip would coincide with the printing pattern of the adhesive in the laminating step (4), substantially all adhesives attached along the printing pattern would stay within the range of a high-frequency irradiation range or a high-frequency heating range. Thus, substantially all adhesives attached along the printing pattern will be heated with a high-frequency to proceed with a curing reaction.

As such, by a high-frequency heating and pressing, the heat-reactive adhesive proceeds with a curing reaction to bond fabrics and thereby to form a bonding line, and the fabric surface is heated and pressed to generate a difference in surface texture and thereby to form a pattern line. The pattern line formed as above is clear and has an excellent finishing quality.

Further, since the fabric is generally very thin, a liquid adhesive attached to the inner surface of an outer fabric can ooze out or permeate to the outer surface of the outer fabric while heated and pressed, although it depends on the constitution and density of the fabric. The portion formed by curing the adhesive which has been oozed out or permeated to or near the surface of the outer fabric has a surface texture different from that of the fabric. Thus, the pattern line may appear clearer.

According to a preferable embodiment of the present invention, a high frequency bonding can be carried out under the conditions that the pressing pattern of the pressing tip or the protrusion is configured to be substantially the same as the printing pattern of an adhesive, and that the printing pattern of the adhesive and the pressing pattern of the pressing tip are adjusted to be coincided with each other and then pressed with a high-frequency heating. If the high-frequency bonding is carried out under a condition where the printing pattern does not coincide with the pressing pattern, the position of the resulting bonding line will not coincide with the position of the resulting pattern line, and as a result, the inner bonding line is not properly formed, thus decreasing the adhesive power. When the inner bonding line does not coincide with the surface pattern line, their uniformity deteriorates. As a result, the capability of an inner adhering line to maintain the shape and surface texture of a surface pattern line may deteriorate, and over time, the shape of the pattern line can be disfigured and its surface texture crumbled, blurring the pattern line.

The width of an inner bonding line depends on the width and/or amount of adhesive, whereas the width of a surface pattern line depends on the width of the pressing pattern carved on the heating tip of a roller or press for a high-frequency heating. Thus, the uniformity and consistency between the printing pattern and the pressing pattern will become more important.

Meanwhile, in a case where fabrics are combined by a sewing manner, the sewing line actually combines an inner fabric and an outer fabric at the inside of the fabrics. Therefore, the sewing line can be considered as a combining line as well as a pattern line since it is visible to the naked eye on the surface of the fabric (outer fabric).

In addition, in a case where fabrics are bonded by a simple hot-pressing using a heat-melting adhesive such as a hot melt, a bonding line is formed between the fabrics, but a pattern line is not formed on the fabric surface. Even if the pattern line is formed, it is not clear and the finishing is poor. The first reason is that the possibility to form a permanent difference in surface texture is low since the bonding process is generally carried out at a relatively low temperature where the hot melt can melt. The second reason is that no difference in surface texture of a fabric is generated since the roller or press generally employed in such process does not have any pressing tip which can selectively press only the part where the hot melt is attached. In addition, the durability of the bonding line formed is low since a heat-melting adhesive such as a hot melt has a low adhesive durability. Accordingly, even if a bonding line and a pattern line are formed, their durability will be low and thus it is highly likely that the clarity of the pattern line will severely deteriorate over time.

Meanwhile, even in a hot-pressing using a heat-melting adhesive such as a hot melt, the melted hot melt may permeate into the fabric and exude to or near to the surface of the outer fabric, which may generate a structure deformation or a surface texture change to form a pattern along the hot melt bonding line. However, since thus formed bonding line is low in the adhesion power and the durability, it is highly likely for the pattern line to get vague and separated from the bonding line over time.

Even where the fabrics are bonded by a simple hot-pressing method using a heat curing adhesive instead of a hot melt adhesive, if a roller or press is used without a pressing tip for selective pressing it is difficult to selectively generate a difference in surface texture on the fabric surface, and thus it is difficult to obtain a clear pattern line. In addition, in a case where the fabrics are subjected to a hot-pressing at a high temperature by a general heating method, not by a high-frequency heating method, it is very difficult to control the temperature so that only a difference in surface texture can be generated without damaging the fabric surface.

Meanwhile, a high-frequency bonding process using an adhesive has been already well known in the field of the adhesion of plastic, paper, rubber, or the like. However, a method which comprises printing the adhesive liquid in a printing manner, pre-drying the printed adhesive liquid, and coinciding the printing pattern with a pressing pattern, i.e., pressing along the printing pattern and simultaneously performing a high-frequency bonding has not been known. Further, there has not been found any prior art that discloses a high-frequency bonding after coating an adhesive liquid on both surfaces to be bonded and drying it, and coinciding these patterns with each other. Further, in the conventional high-frequency bonding of plastic, paper, rubber, etc., it has hardly been known to pattern the bonding line and to utilize thus formed pattern in an aesthetical way.

Double fabrics in which a bonding pattern line for compartment separation is formed by a high frequency bonding method can be sold by itself, or can be conveyed and utilized to the subsequent marking and cutting processes.

7. Marking and Cutting

Marker means a design drawn on a raw fabric wherein pattern pieces are arranged in a maximum efficiency on the raw fabric having a limited size in order to calculate the minimum amount of a raw fabric material to be used. Cutting is a process to cut the fabric along the marker.

As mentioned above, a double fabric prepared by a high frequency bonding method in which bonding pattern lines for compartment separation are formed can proceed to the marking step for marking for cutting on the surface of an outer fabric or an inner fabric, and then the cutting step can be carried out along the marker.

In the pre-cutting post-bonding manner such as a general sewing method, the marking and cutting processes are carried out separately on an outer fabric and an inner fabric (or down back), whereas in the pre-bonding post-cutting manner according to the present invention, the marking and the cutting are carried out on a double fabric consisting of outer fabric and inner fabric which have been laminated and bonded. Thus, the marking of the outer fabric and marking of the inner fabric can proceed simultaneously, and the cutting of the outer fabric and cutting of the inner fabric can proceed simultaneously. Thus, it is possible to achieve accuracy in cutting and the simplification of manufacturing process.

In the pre-bonding post-cutting manner according to the present invention, a process of forming a compartment separation line (e.g., sewing) on patterned pieces is not necessary since patterned pieces is prepared from a double fabric in which compartment separation lines have already been formed. Such process of forming a compartment separation line is one of the most manpower-consuming and time-consuming processes in the production of down products with compartment separation lines, and the omission of this process can not only lead to simplifying of the manufacturing process, saving in manufacturing cost, and increasing in manufacturing speed, but can also provide great advantages in mechanizing the manufacturing process.

The method of the present invention characterized by the pre-bonding and post-cutting manner and the formation of compartment separation line by a high-frequency bonding can provide another advantage of enabling mass production by mechanizing and automating most of the manufacturing processes such as the fabric preparation, the coating of adhesive liquid, the drying, the high frequency heat bonding, the marking and cutting.

8. Overlock Finishing, Down Introducing and Closing of Down Inlet

In the sewing industry, the term "overlock" means an overcasting to prevent the end of a cut fabric from running loose.

In the present invention, the term "overlock" means overcasting to prevent the edge of a cut fabric from running loose, and "overlocking finishing" means a process of forming a compartment wall by overlocking the edge of an inner fabric together with the edge of an outer fabric in a cut piece of double fabric.

When a double fabric prepared according to the present invention in which bonding pattern lines for compartment separation have been formed are subjected to a cutting to obtain a double fabric piece, the double fabric piece has the compartment bonding lines only at the upper and lower sides (edges), but opens in the left and right sides (edges). The open edges at the left and right sides should be subjected to a closing process by carrying out an overlock finishing. At this time, it is necessary not to close the entire edge part and leave a part of it open for a down inlet for introducing down into the compartment.

The term "down introduction" means the introduction of a predetermined amount of down (duck down, goose down, etc.) into a compartment. Recently, down introduction is carried out by inserting a tube for down introduction into a compartment through the down inlet, and introducing down through the down inlet. In the present invention, there is no particular limitation in the location and size of down inlet and the down introducing method.

According to an embodiment, a predetermined amount of down can be introduced into a down compartment by an air jet method in which a large amount of ambient air is inhaled and discharged by using the Coanda phenomenon (which is a phenomenon that high speed gas or fluid is adsorbed on a wall surface).

If a required amount of down is introduced, the down let can be closed, for example, by overlock finishing.

In general, with regard to down products having down compartments, there are many cases where down escapes or rain permeates through the sewing holes of the overlock finishing. Thus, there have been developed various overlock finishing methods provided with water resistance to prevent the problems. For example, there have been suggested a sewing method wherein an added fabric, a seam sealing tape, a double-sided tape or the like is inserted between an inner fabric and an outer fabric and then sewed, a sealing method wherein the sewing area subjected to a overlock finishing is covered and closed with an adhesive tape, a fabric tape or the like.

According to a variant of the present invention, it is possible to carry out an overlock finishing on only one open edge among two open edges, to introduce down through the other edge which is still open, and then to carry out another overlock finishing on the other open edge.

9. Assembling and Finishing of the Assembled Areas

The term "assembling" means a step of connecting clothes pieces or partial panels of down products to make a completed down product.

In a case that the down product is a down jacket, a double fabric may be marked and cut into pattern pieces, or panel pieces, including a rear (back) piece, a left-front piece, a right-front piece, a left arm piece, a right arm piece, an optional hood piece and the like. These pattern pieces, or panel pieces, are each subjected to the processes of overlock finishing, down introducing and closing down inlet to make the corresponding clothes pieces or clothes panels (e.g., a back portion, a right-front portion, a left-front portion, a right arm portion, a left arm portion, and the like).

The prepared clothes pieces are subjected to an assembling process by connecting them with each other by sewing, overlocking or the like.

Also, these connected areas or assembled areas can be subjected to a water-proof treatment by a pattern-processing in an identical design with a fabric of the same kind and then a welding/bonding treatment. The pattern-processing can be carried out by using a conventional method.

For assembling and finishing of the seamed areas, it is possible to employ any methods which are commonly used in the pertinent art or known in documents.

10. Double Fabric and Down Product

When down products are manufactured by the pre-bonding post cutting manner according to the present invention, it is possible to manufacture a double fabric for a down product comprising at least one bonding pattern line for compartment separation which is composed of an inner bonding line formed between the inner fabric and the outer fabric and a surface pattern line formed on the surface of the outer fabric. The double fabric can have the following characteristics:

said inner bonding line is formed on the inner surfaces of the inner fabric and the outer fabric by fixing a heat-reactive adhesive on the surface of the inner or outer fabric in a predetermined printing pattern, high-frequency heating and curing said fixed adhesive, and thus combining said fabrics with the reacted and cured adhesive, said surface pattern line is formed on the surface of the outer fabric by pressing said inner fabric and outer fabric together in a predetermined pressing pattern under a high-frequency heating to cause a difference in surface texture, the inner bonding line from said printing pattern and the surface pattern line from said pressing pattern are the same in pattern (shape) and have a width difference of 10% or less, and said surface pattern line is substantially unified with the inner bonding line by the adhesive oozed onto or near to the surface of the outer fabric and then cured.

In the context of the present invention, where the bonding pattern line is composed of an inner bonding line and a surface pattern line, the expression, that "the surface pattern line is unified with the inner bonding line," means that the surface pattern line formed in the present invention comprehensively reflects a change in surface texture which is caused from the changes in the surface formation and surface structure of the fabric generated by a high frequency heating and pressing of the fabric as well as a change in surface texture which results from the change in the inner formation and inner structure of the fabric generated due to an adhesive which has oozed out to the surface of the fabric or its vicinitiy and then cured. The unification of the surface pattern line and inner bonding line can be further improved when the fabric has a higher ability to absorb a liquid adhesive and/or the adhesive liquid has a higher ability to penetrate into the fabric.

11. Reinforced Material

According to the present invention, a reinforced material can be additionally inserted between the inner fabric and the outer fabric. The reinforced material can be inserted in a continuous manner between the adjacent pattern bonding lines or in a discontinuous manner at and near to the pattern bonding lines.

Specifically, it is possible to manufacture a down product comprising at least one reinforced material-containing bonding pattern line, said reinforced material-containing bonding pattern line being composed of an inner bonding line formed by together combining an inner fabric, a reinforced material and an outer fabric between the inner fabric and the outer fabric and a surface pattern line formed on the outer surface of the outer fabric, and characterized in that:

said inner bonding line is formed on the inner surfaces of the inner fabric and the outer fabric by fixing a heat-reactive adhesive on the inner surface of the inner or outer fabrics in a predetermined printing pattern, laminating the inner fabric-reinforced material-outer fabric, curing said fixed adhesive with a high-frequency heating and thereby bonding said inner fabric-reinforced material-outer fabric with the cured adhesive, and said surface pattern line is formed on the surface of the outer fabric by pressing said inner fabric-reinforced material-outer fabric together in a predetermined pressing pattern under the high-frequency heating to cause a difference in surface texture from the non-pressed area.

The above down product comprising at least one reinforced material-containing bonding pattern line can be manufactured by a method comprising:

(1) a preparing step of preparing an inner fabric, a reinforced material, and an outer fabric, (2) a printing step of printing a heat-reactive liquid adhesive in a predetermined printing pattern on the inner surface of the inner fabric, on the reinforced material, or on the inner surface of the outer fabric, (3) a drying step of drying the liquid adhesive printed on the inner surface of the inner fabric, on the reinforced material, or on the inner surface of the outer fabric, (4) a laminating step of laminating the inner fabric, the reinforced material, and the outer fabric, and (5) a high-frequency bonding step of high-frequency heating and simultaneously pressing the laminated inner fabric-reinforced material-outer fabric in a pressing pattern which is the same pattern as said printing pattern to form the bonding pattern line.

It is preferable for a reinforced material employed in the present invention to have a permeability (liquid permeability) such that a liquid adhesive at a printing step and/or a liquefied adhesive at a high-frequency heating step can pass through the reinforced material, such permeability can be achieved by suitably selecting the properties (e.g., wettability) of the reinforced material and the interval between strands (mesh size). Generally, it is preferable to employ a mesh-type reinforced material that has a larger net size than a common fabric or nonwoven fabric.

A reinforced material employed in the present invention has preferably a small change or no change in shape during a high-frequency bonding step, and can be made, for example, with a thermosetting synthetic fiber.

In the present invention, as a reinforced material that is liquid permeable, mention can be made of a mesh-type reinforced material, which can have a mesh thickness of generally 0.01~2 mm, preferably 0.1~1 mm, more preferably 0.2~0.5 mm and a mesh size of generally 0.1~5 mm, preferably 0.2~2 mm, more preferably 0.5~1 mm. As long as a reinforced material is liquid permeable, the mesh thickness and mesh size may not be restricted to the above range.

In a case where a reinforced material is employed, a liquid adhesive at a printing step (2) can be printed only on an inner fabric and/or an outer fabric, or only on the reinforced material, or on both of the fabric and reinforced material.

When an adhesive is applied only to fabrics, a liquid adhesive is applied and dried on the inner surface of an inner fabric and/or the outer surface of an outer fabric in a predetermined pattern, a reinforced material can be simply inserted between, and laminated with, the inner fabric and the outer fabric to perform a high-frequency bonding under a pressing, and thereby to form a reinforced material-containing bonding pattern line.

When an adhesive is applied only to a reinforced material, a liquid adhesive is not applied to an inner fabric and an outer fabric, but is applied and dried on any one or both surfaces of the reinforced material in a predetermined pattern, the resulted adhesive-attached mesh material can be simply inserted between, and laminated with, an inner fabric and an outer fabric to perform a high-frequency bonding, and thereby, a mesh-reinforced bonding pattern line can be formed. In a case where the reinforced material has a good liquid permeability, the adhesive can be applied to only one surface of the reinforced material. In a case where the reinforced material has a poor liquid permeability, the adhesive can be symmetrically applied to both surfaces of the reinforced material.

In a case where a mesh-type reinforced material is employed, it is possible to apply an adhesive to a mesh material and dry it to obtain an adhesive-attached mesh material, which is continuously or discontinuously inserted between fabrics and then subjected to a laminating step.

In general, a mesh material that constitutes a mesh-type reinforced material can plays a role of helping sustain and maintain the shape of the fixed adhesive at the adhesive-fixed mesh-type reinforced material as well as a role of preventing a liquefied adhesive from spreading out during a high-frequency bonding, and thereby, the mesh material can improve the adhesiveness, durability and finishing quality of a pattern boding line. Whereas, since hot melt adhesives are prepared by solidifying or shaping solid adhesives, there has not been proposed a case that any reinforced material is contained in the hot melt. Therefore, a hot melt that is commonly employed is different in constitution from the adhesive-fixed reinforced material of the present invention, and does not exhibit any advantageous action and effect owing to the reinforced material (mesh).

A reinforced material can be selected specifically from a mesh-type reinforced material and preferably from a mesh material. A mesh fabric as a mesh material can be inserted and laminated between an inner fabric and an outer fabric, thereby can be continuously present between the adjacent pattern bonding lines. The mesh fabric can be cut in a suitable size (width) and shape to be inserted and laminated between an inner fabric and an outer fabric, and in such case, the mesh material can be present discontinuously only at or near each pattern bonding lines.

Thanks to the mesh material reinforced between fabrics, d own products having at least one reinforced material-containing pattern bonding line, specifically down products having at least one mesh-reinforced pattern bonding line has not only more excellent adhesive strength and durability, but also they do not damage or rather can improve the clearness and finishing quality of the pattern bonding line.

In the present invention, a reinforced material can be selected from common woven fabrics or non-woven fabrics if it has a sufficient liquid permeability and shape variability. In such case, it is preferable for the woven fabrics or non-woven fabrics to have a relatively large space between the strands, for example a pore size (a distance between a strand and a strand) of 0.1~3 mm.

Hereinafter, the present invention will be explained in more detail with reference to the drawings.

FIG. 1 is a drawing showing the order for preparing a down product having compartments in comparison of the present invention with prior art. Drawing (1a) and Drawing (1b) respectively illustrate a flow chart showing the manufacturing process of a pre-bonding post-cutting manner, and a flow chart showing the manufacturing process of a pro-cutting post-bonding manner, according to the high frequency bonding technique of the present invention, and Drawing (1c) illustrates a flow chart showing the manufacturing process of a pre-cutting post-bonding manner according to the sewing method of prior art.

Specifically, Drawing (1a) illustrates the order for manufacturing a down product by a pre-bonding post-cutting manner according to the present invention, wherein compartment separation lines are firstly formed on the fabrics themselves by a high frequency bonding to prepare a double fabric, which is then subjected to subsequent processes to manufacture down products. Drawing (1b) illustrates the order for manufacturing down products by a pre-cutting post-bonding manner according to the present invention, wherein a fabric is firstly cut to prepare product parts, on which compartment separation lines are then formed by a high frequency bonding. Drawing (1c) illustrates the order for manufacturing down products by a pre-cutting post bonding manner according to prior art, wherein a fabric is firstly cut to prepare product parts, on which compartment separation lines are formed by a sewing method.

According to Drawing (1a) in the attached FIG. 1, the method for preparing down clothing of the present invention can be largely divided into (1) a fabric preparing step of preparing fabrics, (2) a printing step of preparing and printing an adhesive, (3) a drying step of drying the adhesive, (4) a laminating step of laminating the fabrics, (5) a high frequency bonding step, (6) a marking and cutting step, (7) subsequent steps including an overlock finishing, down introducing and down inlet closing, and (8) an assembling step of the clothes pieces and a finishing step of the assembled parts.

If the process for preparing down products by a high frequency heat bonding method and a pre-bonding post cutting manner according to the present invention (Drawing 1a) is compared with the process for preparing down products by a sewing method and a pre-cutting post bonding manner according to prior art (Drawing 1c), the differences in process and the accompanying differences in effect can be understood more clearly.

Further, even if the process for preparing down products by a high frequency heat bonding method and a pre-cutting post bonding manner according to the method of the present invention (Drawing 1b) is compared with the same preparation process of prior art (Drawing 1c), the differences in process and the accompanying differences in effect can also be understood more clearly.

Figure 2:
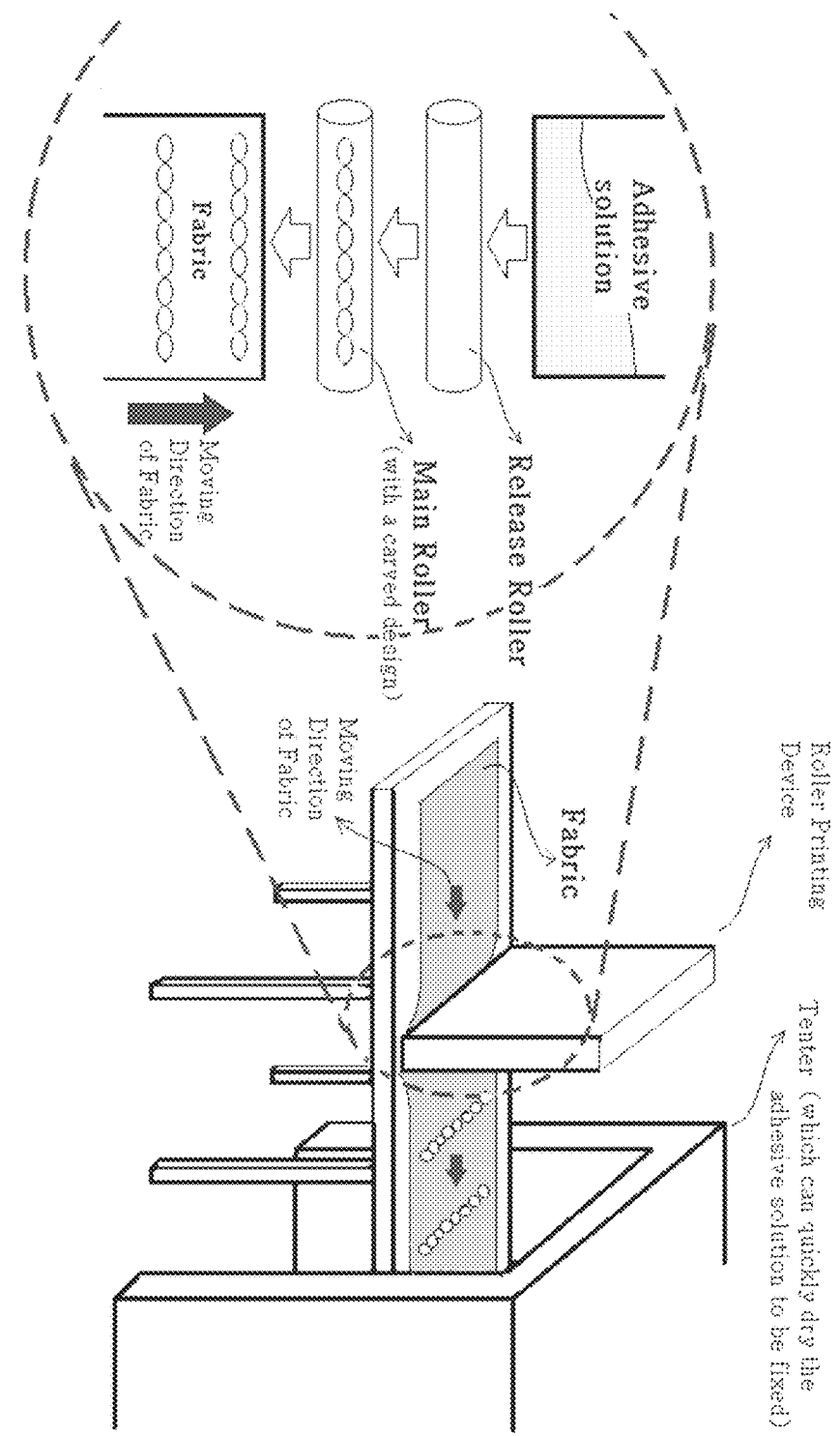
FIG. 2 is a drawing explaining the order of the process from the printing step to the drying step.

FIG. 2 illustrates the order of the processes from a printing step to a drying step.

The left-side drawing of FIG. 2 explains the process of printing an adhesive liquid on a fabric by a roller printing technique, wherein the roller printing device comprises a container for an adhesive liquid, a release roller for delivering the adhesive liquid, a main roller carved with a printing pattern, and a guide knife (not shown) for removing excessive adhesive. The adhesive flows out the container, is coated over the surface of the release roller, and then moves to the surface of the main roller that is interlocked and rotated with the release roller and into grooves of the printing pattern on the main roller. At this time, the adhesive adhered on the surface of the main roller is removed by the guide knife attached to the main roller, except for the adhesive liquid in the grooves of the printing pattern. Thereafter, the adhesive liquid within the groove of the printing pattern on the main roller moves, when being contacted with a fabric, from the groove of the printing pattern to the surface of the fabric. By this process, the adhesive liquid is printed on a fabric in the form of a printing pattern.

The right-side drawing of FIG. 2 explains the process of printing an adhesive liquid on a fabric by a roller printing method, and then delivering it to a drying device such as a tenter. Drying can be carried out at room temperature or at a high temperature optionally under air blast. It is carried out to prevent the adhesive liquid from flowing over during the subsequent delivering step, and to prevent the adhesive liquid from flowing over or being transferred or stained in the subsequent laminating process.

Figure 3:
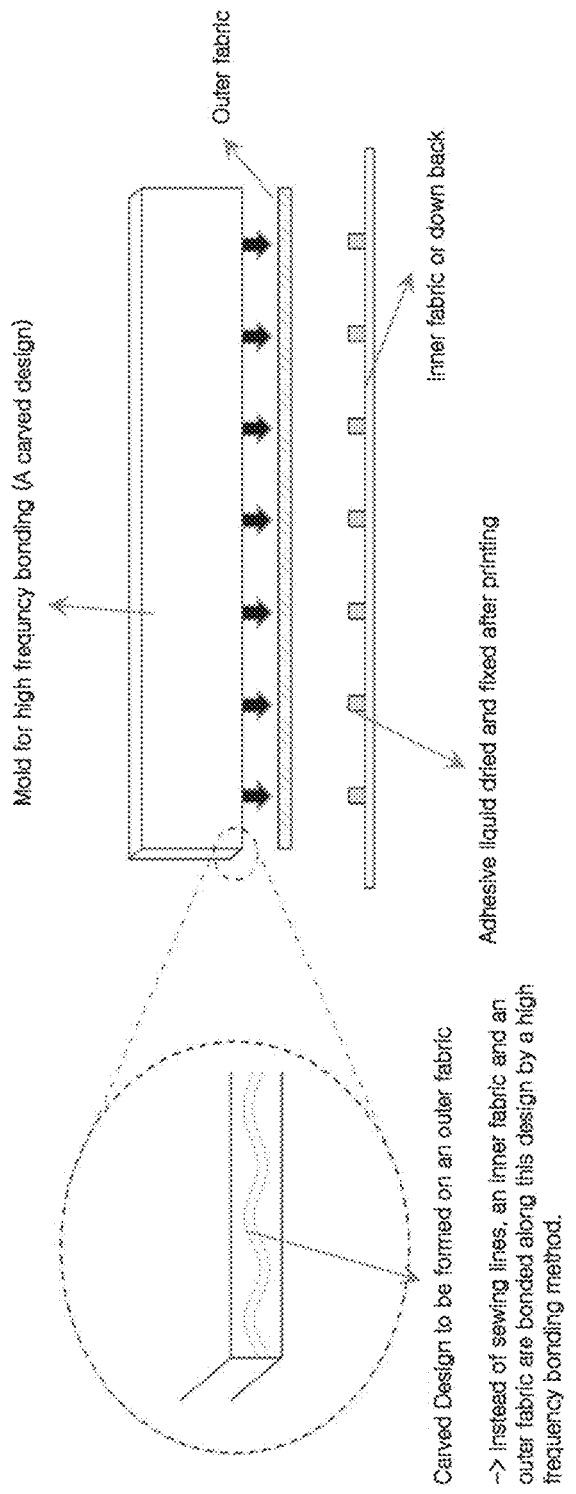
FIG. 3 is a conceptual diagram wherein an adhesive is printed on only an inner fabric and then subjected to a high frequency bonding process.

FIG. 3 is a conceptual diagram to explain a process that an adhesive liquid is printed on either an inner fabric or an outer fabric to carry out a high frequency bonding, wherein the high frequency bonding process is carried out by printing a liquid adhesive only onto an inner fabric when a functional fabric or a fabric whose inner surface is coated is employed as an outer fabric. Without printing the adhesive liquid on an outer fabric, the adhesive liquid is printed and dried in a predetermined printing pattern only on an inner fabric, or also referred to as down back, and then an outer fabric is closely contacted with and stacked onto the resulted inner fabric, or down back, on which a dried and solidified adhesive ("adhesive solution that has been printed, dried and solidified") is attached. On a mold (a carved design) for a high frequency bonding, a pressing tip or a protrusion having a predetermined pressing pattern is formed, but said pressing tip or protrusion is not explicitly shown in the drawing. By using the above mold, a high-frequency bonding can be performed. At this time, the adhesive dry-fixed on the inner surface of the inner fabric and the printing pattern thereof cannot be seen due to the outer fabric stacked thereon. Under this circumstance, the pressing tip (the pressing tip attached on the "mold for high frequency bonding") is placed on the outer fabric. At this time, the position of the pressing tip is controlled so that the printing pattern of the inner fabric is coincided with the pressing pattern of the pressing tip. Thereafter, the pressing tip is lowered to press the laminated fabric and simultaneously heat it by a high frequency heating. The adhesive liquid dried and solidified on the inner fabric is subjected to a curing reaction to bond the inner fabric and outer fabric, and thereby to form a bonding line. The pattern line of the pressing pattern is formed on the surface of the outer fabric by a hot-pressing using the pressing tip. After a certain period of time, when the pressing tip (the pressing tip of the mold for high frequency bonding) is lifted off from the fabric, there can be obtained a double fabric in which a bonding line is formed between the fabrics and a pattern line is formed on the surface of the outer fabric. The above method can also be applied to the case where both of the outer fabric and inner fabric are a common fabric or a down proof fabric.

Figure 4:
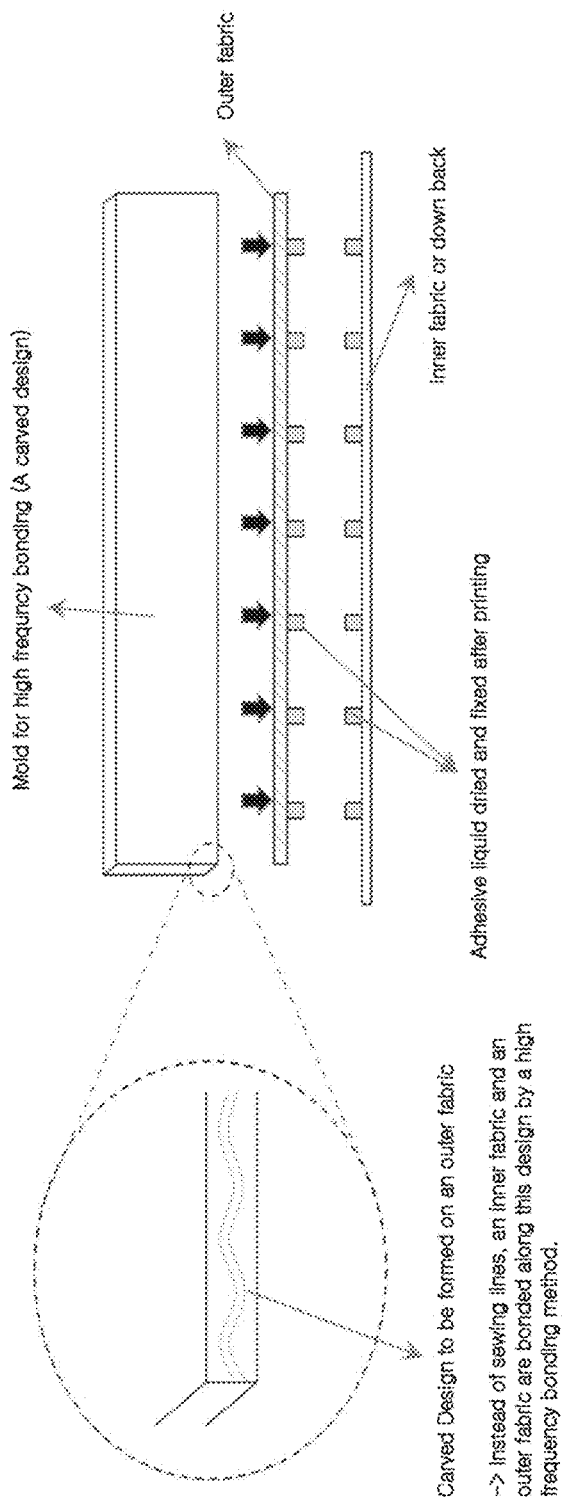
FIG. 4 is a conceptual diagram wherein an adhesive is printed on both of an inner fabric and an outer fabric and then subjected to a high frequency bonding process.

FIG. 4 is a conceptual diagram of a process wherein both of the inner fabric and outer fabric are printed with an adhesive liquid and subjected to a high frequency bonding, which can be mainly applied to when the outer fabric is a common fabric or down proof fabric. The adhesive liquid is printed and dried in a predetermined printing pattern on an inner fabric, or down back. Next, the inner fabric, or down back, attached with the dry-fixed adhesive liquid (adhesive solution) is stacked on an outer fabric on which an adhesive is dried and fixed in the same printing pattern. At this time, it is important to laminate the fabrics so that the printing pattern of the adhesive liquid of the outer fabric is coincided with the printing pattern of the adhesive liquid of the inner fabric. Under the state where both patterns of the adhesive liquid attached to the inner surface of the inner fabric and inner surface of the outer fabric are not shown due to the outer fabric, a mold for high frequency bonding (i.e., roller or press) having a pressing tip formed in a pressing pattern that is the same pattern as the printing pattern is positioned on the outer fabric, and the inner fabric (10) and outer fabric are bonded by the adhesive liquid by a pressing and high frequency heating. After a certain period of time, when the mold is removed from the outer fabric, there can be obtained a double fabric in which a bonding line is formed between the fabrics and a pattern line is formed on the surface of the outer fabric.

According to the present invention, since a double fabric for down products can be obtained by a pre-bonding post-cutting manner, various advantages can be obtained. For example, when compared with a common sewing method, mention can be made of advantages such as (1) an process automation due to an adhesion printing technology and a high-frequency bonding process, (2) an improvement in the productivity and in the cutting accuracy due to the reduction of the number of articles to be cut, and (3) a reduction in the manufacturing cost due to the reduction of the number of sewing processes for forming compartment separation lines, which is a manpower- and time-consuming process, and others such as an increasing of manufacturing speed and a possibility of mass production, or the like.

The process automation can be achieved since it is possible to mechanize or automate all individual processes to prepare a double fabric according to the present invention, that is, the preparing step, the printing step, the drying step, the laminating step and the high-frequency bonding step. In prior art, it is substantially impossible to achieve the mechanization or the process automation since it essentially comprises a sewing process that cannot be mechanized, whereas in the present invention, it is possible to achieve the mechanization and the process automation since a compartment separating line can be formed without a sewing process and before a cutting process. Although the number of processes increases due to the addition of an adhesive printing step and a drying step, the overall manufacturing time can be reduced since these steps can be mechanized and automated and proceed with the mechanical transferring apparatus of a conveyer manner. Further, since the formation of patterns can be mechanized and automated due to a printing step using a printing technique and a high-frequency bonding step, the manufacturing time can be further reduced.

Further, since bonding lines are integrally formed by a printing method, it is possible to obtain the same effect as when forming the pattern line on the product surface in a printing manner, i.e., it is possible to form minute and clear pattern lines with an excellent finishing quality.

Further, the improvement in the accuracy of a cutting can be achieved by cutting a double fabric where the inner fabric and outer fabric are unified. In the present invention, since the outer fabric and inner fabric (or down back) are unified into a double fabric by a bonding line and they are cut together, possible errors while cutting can be minimized or prevented fundamentally. In addition, such unified cutting can reduce the number of clothes pieces to be cut almost to a half, and thus can increase the productivity.

Furthermore, the reduce in sewing process and shortening of manufacturing process can be achieved by using a double fabric in which compartment separation lines are formed in advance, and adopting a pre-bonding post-cutting process. That is, by forming the compartment separation lines at initial stage by an automated process, the sewing step for forming compartment bonding lines can be removed in subsequent steps, and accordingly the manpower and time required can be saved. Comparing the number of processes and manpower required for the steps of preparing fabric and manufacturing the product, the conventional method of forming compartment bonding lines by sewing requires 40~50 processes and an average of about 60 people, whereas the method of the present invention forming compartment separation lines by high frequency bonding requires 30~35 processes and an average of about 45 people. Thus, the number of processes and manpower required can be greatly reduced.

In the present invention, the drying of an adhesive liquid is very important in forming compartment bonding lines (i.e., bonding lines and pattern lines) in high quality and high efficiency by a high-frequency bonding method. The drying of an adhesive liquid printed on the fabric is important not only because it prevents adhesive liquid from being transferred or remaining sticky and getting stuck onto something else when the fabrics are stacked or rubbed together during a laminating process, but also because it allows the bonding pattern line to be formed in high quality. This is because too high fluidity of the adhesive liquid melted during a high frequency bonding may lead to insufficient adhesiveness or a poor finishing at the resulting bonding lines. The dried adhesive liquid can be melted at a high temperature generated by a high frequency heating. When the melted adhesive liquid is pressed by a high frequency heating roller or press, the melted adhesive liquid having too high fluidity may spread out to the sides too much and far, which makes the amount of the adhesive liquid for forming the bonding lines insufficient or lacking. Further, the adhesive liquid that spreads out too far out of the range of high-frequency heating may not be heated, and thereby, may not proceed with the reaction.

Figure 5:
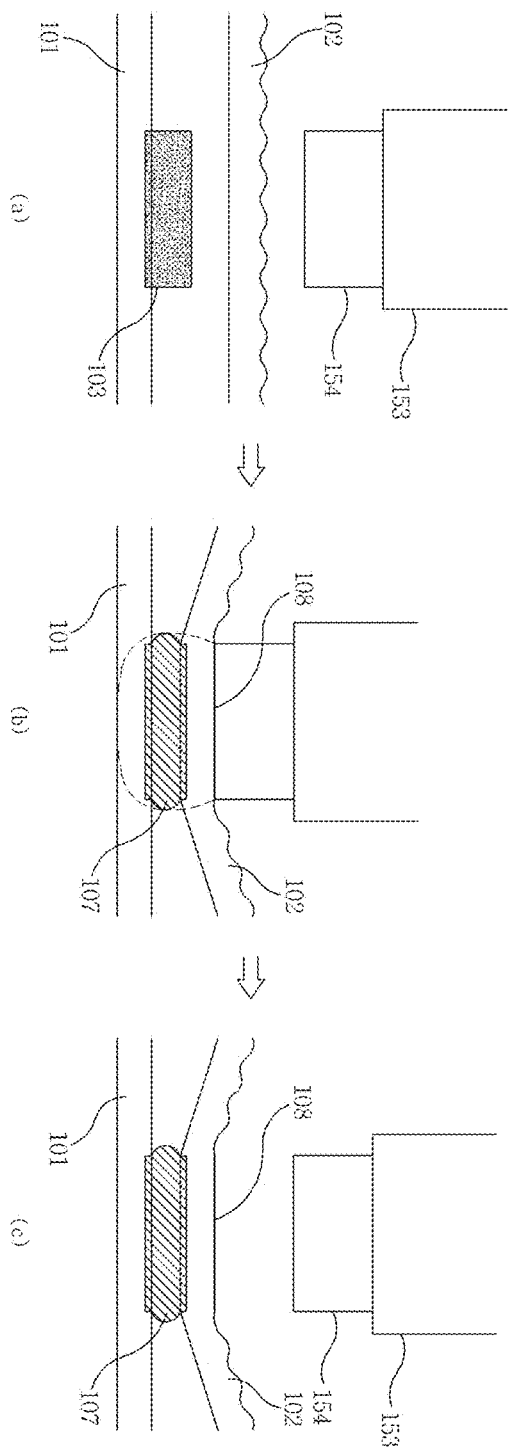
FIG. 5 is a conceptual diagram explaining the behavior of an adhesive liquid when a high frequency bonding is carried out in a state where the adhesive liquid is sufficiently dried to properly adjust the fluidity to form a bonding pattern line.
Figure 6:
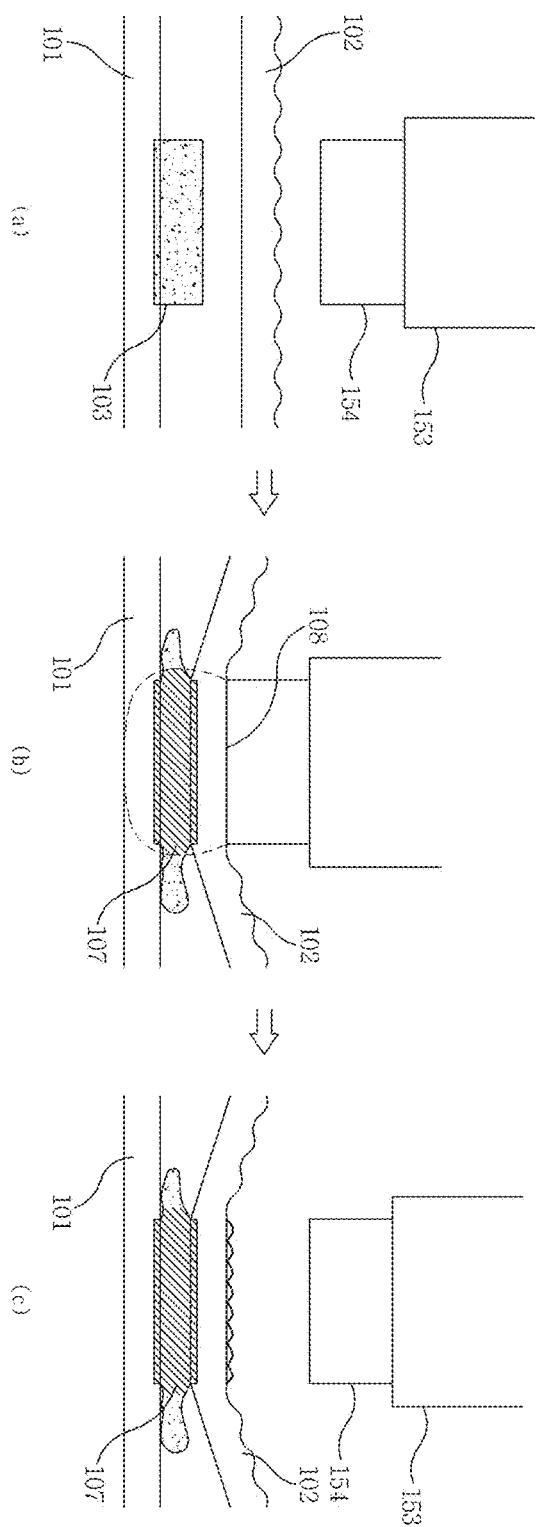
FIG. 6 is a conceptual diagram explaining the behavior of an adhesive liquid when a high frequency bonding is carried out in a state where the adhesive liquid has an excessive fluidity to form a bonding pattern line.

FIGS. 5 and 6 show the importance of drying in the present invention, and explain the behavior of an adhesive liquid and the relation between the resulting bonding line and the pattern line during a high-frequency heating and pressing.

FIG. 5 is a diagram that explains the behavior of a properly dried adhesive liquid during a high frequency bonding process and the shape and form of the resulting bonding pattern line. Drawing (a) represents a state before a high frequency bonding process, wherein the inner fabric (101) and the outer fabric (102) are laminated and the printing pattern of the adhesive liquid (103) printed on the inner fabric (101) is arranged to coincide with the pressing pattern of the pressing tip (154); Drawing (b) represent a state during the high frequency bonding process, wherein the pressing tip (154) presses the outer fabric (102) to form a pattern line (108), and the adhesive liquid is heated and subjected to a curing reaction to form a bonding line (107); and Drawing (c) represents a state after the completion of the high frequency bonding process, wherein the inner fabric (101) and the outer fabric (103) are combined by a bonding line (107) made from the adhesive, and a pattern line (108) is formed on the surface of the outer fabric (103). At this time, since the adhesive liquid was properly dried, the adhesive liquid did not flow over or spread out during the high frequency heating and pressing, and the curing reaction could proceed within the high frequency heating area. As a result, the quality (clearness, finishing) and properties (adhesion power, durability) of the bonding pattern line are excellent.

FIG. 6 is a diagram that explains the behavior of an adhesive liquid that is not properly dried or has high fluidity during a high frequency bonding process and the shape and form of the resulted bonding pattern line. Drawings (a), (b) and (c) in FIG. 6 correspond to Drawings (a), (b) and (c) in FIG. 5. Since the adhesive liquid (103) printed on the inner fabric (102) has a high fluidity during the high frequency bonding (Drawing (b)), it spreads out of the high frequency heating range indicated by dotted lines before a curing reaction is performed to form a bonding line (107). When an adhesive liquid that has spread out of the high frequency heating range is subjected to a curing reaction, it adheres to the fabric outside the intended bonding line and thereby it may make the finishing of the bonding line poor; and when the adhesive does not proceed to a curing reaction, it remains as an unreacted adhesive liquid (the parts represented by ▓ in 107) and thereby it may make the down within the compartment tangle later on.

According to a preferable embodiment of the present invention, it is preferable that the printing pattern of the adhesive liquid is substantially the same as the pressing pattern of the pressing tip in a high frequency heating roller or press, and the difference in width between them should be within 20%, particularly within 10%, and preferably within 5%. It may be preferable that the pressing pattern of a pressing tip is slightly smaller than the printing pattern of an adhesive liquid in order to form a clearer pattern line and more excellent finishing of the pattern line.

In the present invention, if the pressing pattern of a heating tip in a high-frequency heating roller or press is substantially the same in shape and size as the printing pattern of an adhesive liquid, or if the difference between them is within 5%, most of the adhesive can be included in the adhering line or bonding line, and thereby, the quality (clearness, finishing) and property (adhesiveness, durability) of the resulted bonding pattern line can be satisfied. By suitably selecting the dryness degree of the adhesive and the difference in size of the pressing pattern and the printing pattern, it is possible to reduce to the minimum the amount of non-reactive adhesive which has been flowed out or squeezed out during the heating and pressing and thus is not included in the bonding line.

If the pressing pattern of a pressing tip is too wider than that of the printing pattern of an adhesive liquid, most of the printed adhesive can be used for forming a bonding line, but the printed adhesive cannot cover all the width of the pressing pattern since the amount of the adhesive is relatively small when taking consideration of the width of the pressing pattern. Thus, the inner bonding line would be irregular or bumpy in its edges and have a poor finishing. In addition, since a surface pattern line that cannot be supported by the inner bonding line may be partially formed, the quality of the bonding pattern line would deteriorate as a whole.

If the pressing pattern of a pressing tip is too narrower than the printing pattern of an adhesive liquid, or if the printing pattern of an adhesive liquid is too wider than the printing pattern of a pressing tip, although the overall surface pattern line can be supported by the inner bonding line, the adhesive liquid, which is present outside the high-frequency heating range similarly to the pressing pattern, would not be heated sufficiently, and thus the ratio of non-reactive adhesive liquid would increase. Accordingly, all of the printed adhesive would not be used for forming a bonding line, which makes the above process economically inefficient, and which occasionally also results in insufficient adhesion. In addition, the non-reactive adhesive liquid may cause a tangling of down within a compartment, and it may have a curing reaction, albeit slowly, during a high-temperature washing or drying, and thus the finishing quality of the bonding pattern line can be affected unfavorably and thereby a product defect may be generated.

Figure 7:
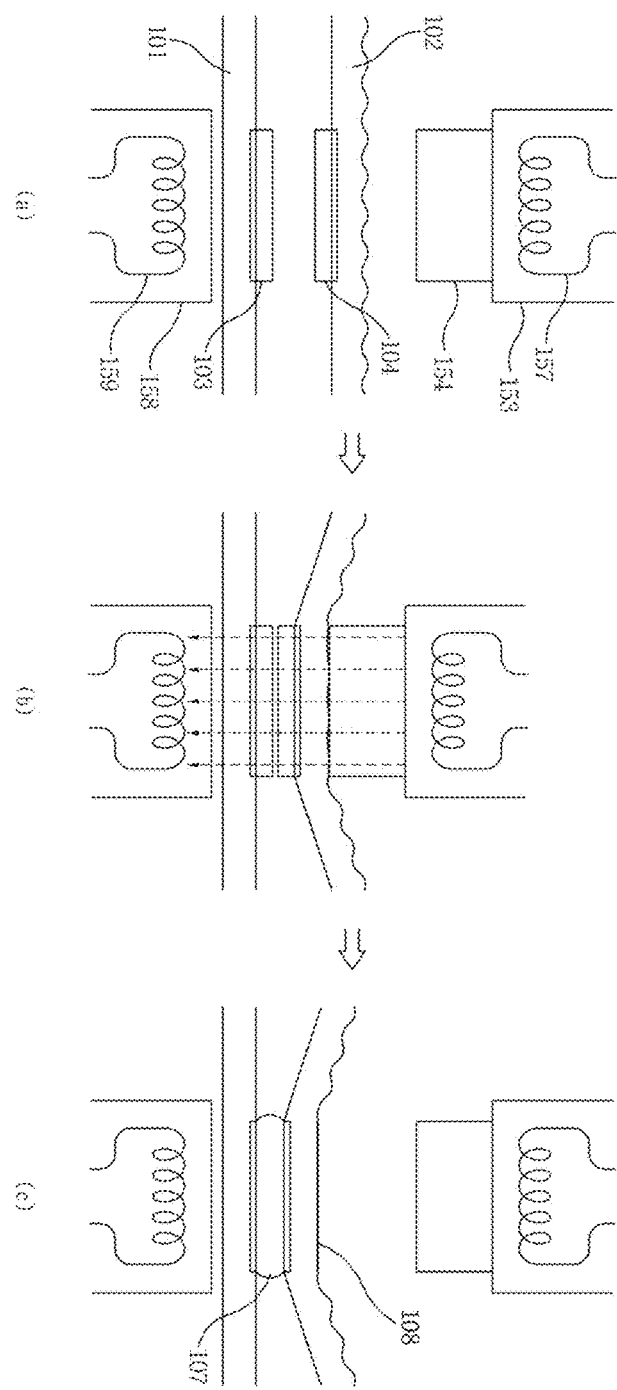
FIG. 7 is a conceptual diagram explaining a process wherein a bonding pattern line composed of an inner bonding line and a surface pattern line is formed when fabrics printed with an adhesive are subjected to a high frequency bonding (a high frequency heating and pressing).

FIG. 7 schematically explains a high-frequency bonding process that is performed in the dielectric heating manner.

As illustrated in Drawing (a), a high frequency circuit (157) and a high frequency circuit (159) are installed in the pressing press (153) and the support (158), respectively, and the protrusion (154) attached to the end of the pressing press (153) acts as a pressing tip.

As illustrated in Drawing (b), in the dielectric heating manner, the adhesives (103 and 104) located within the magnetic force lines of the above two high-frequency circuit coils (157 and 159) are selectively heated by a dielectric heating. In some cases, the fabric itself located within the magnetic force lines may be heated. The irradiating of a high-frequency and the pressing by the protrusion (154) of the pressing press (153) are simultaneously carried out on the same area of a fabric surface, and the formation of an inner bonding line by a curing reaction of an adhesive and the formation of a surface pattern line by a pressing with a pressing tip can be simultaneously made. On the other hand, the induction heating manner is not a method in which an adhesive is directly heated or an adhesive generates heat, but is a method in which the heat generated inside the induction circuit is delivered or conducted to the protrusion, and the heat at the protrusion is delivered or conducted to the adhesives in the inner surfaces of the fabrics to cause a curing reaction of the adhesives.

As illustrated in Drawing (c), when the adhesives (103 and 104) printed in a predetermined printing pattern are heated and pressed with a heating tip (154) having a pressing pattern that is the same pattern as the printing pattern so that they are coincided with each other, it is possible to obtain, at the same time and in the same pattern, a bonding line (107) having an excellent adhesiveness and a pattern line (108) having an excellent finishing quality, as in the high-frequency induction heating manner.

In the high-frequency dielectric heating method, it is necessary to properly select the frequency of the high frequency applied, irradiation time and power in consideration of the heating temperature of the desired adhesive and dielectric heating constant of the adhesive.

If a bonding process is carried out in the high frequency dielectric heating method in a state where the printing pattern and pressing pattern do not coincide with each other, the adhesive located outside the area of magnetic line of force is not heated and thus does not go through curing, or even if it goes through curing, it may not be pressed; then, due to the un-evenness of the bonding line within the fabric and inconsistency between the bonding line and pattern line, the pattern line finishing may be poor, and the inner fabric and outer fabric may not bond to each other at some portions of the pattern lines.

Meanwhile, in case of using a bonding means in the high frequency induction heating method, the protrusion acts as a pressing heating tip, and the adhesive is heated with the heat generated at the pressing heating tip and delivered through the fabric. The pressing heating tip heat-presses the fabric that has been laminated with the printing patterns coinciding with each other along a pressing pattern, and if the printing pattern and pressing pattern are the same and they are heat pressed in a state of coinciding with each other, a bonding line formed by an adhesive cured along the pressing pattern is formed on the inner surface of the fabric and a pattern line formed along a pressing pattern is formed on the fabric surface simultaneously in the same pattern. In this case, the bonding strength of the bonding line (i.e., compartment separation line) and the finishing quality of the pattern line are very excellent. In the high frequency induction heating method, it is necessary to properly control the temperature of the pressing heating tip and pressing time so that the temperature of the fabric surface does not get too high.

If a high frequency bonding is carried out in a state where the printing pattern and pressing pattern do not coincide with each other, the adhesive located outside the area of the heating pressing tip may not go through a curing reaction or even if it goes through the curing reaction, it may not be bonded. Thus, in the same manner as above, due to the un-evenness of the bonding line within the fabric and inconsistency between the bonding line and pattern line, the pattern line finishing may be poor, and the inner fabric and outer fabric may not bond to each other at some portions of the pattern lines.

Figure 8:
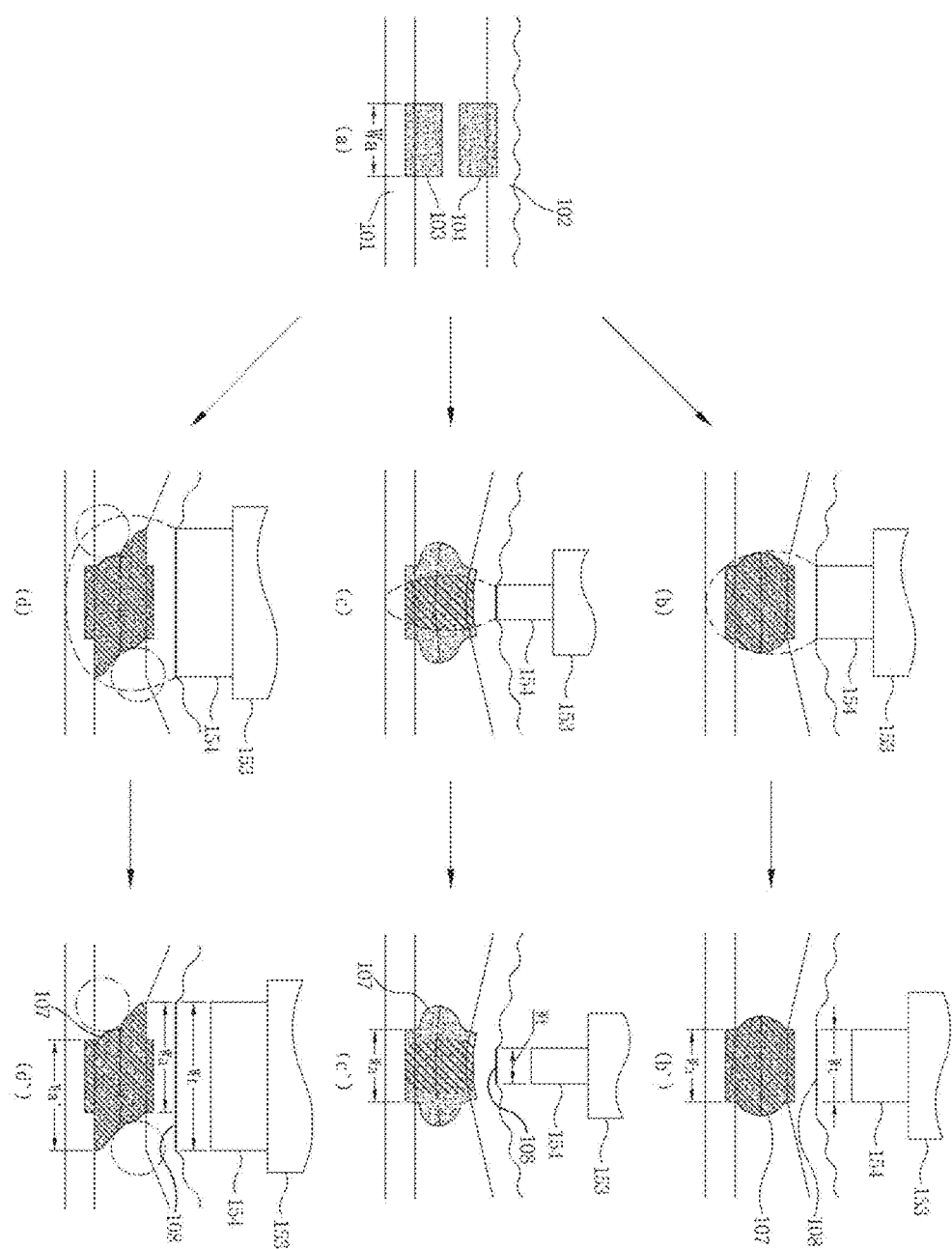
FIG. 8 is a conceptual diagram explaining the shape and problem of the bonding pattern line in a case where the width of a printing pattern is different from that of a pressing pattern; which explains the behavior of the adhesive and the shape of the bonding pattern line according to the width difference between the printing pattern and the pressing pattern.

FIG. 8 is a diagram explaining the behavior and formation of a bonding line depending on the difference of the width (Wt) of the printing pattern of the pressing tip and the width (Wa) of the pressing pattern of the adhesive liquid, and problem thereof. Drawing (a) in FIG. 8 illustrates a state where an inner fabric (101) printed with the adhesive liquid (103) and outer fabric (102) printed with the adhesive liquid (104) are laminated.

Drawing (b) in FIG. 8 shows the process of forming a bonding line (107) in case the widths of the pressing pattern and printing pattern are substantially the same (Wt=Wa). In this case, most of the adhesive comes within the range of high frequency heating (circular dotted line), and the bonding line (107) after curing is formed to almost coincide with the pattern line (108). The amount of adhesive spread outside a predetermined intended pattern line (i.e., width of pressing pattern) is minimized, and thus the resulting bonding line (107) is formed to have a uniform width and its finishing is excellent.

Drawing (c) in FIG. 8 shows the process of forming a bonding line (107) broader than the pattern line (108) in case the pressing pattern is narrower than the printing pattern (Wt<Wa), and problems generated in the process. The bonding line (107) after curing may be formed to be wider than the pattern line (108) and the pattern line may be formed to have excellent finishing. However, on the inner surface of the fabric, non-reactive adhesive liquid (the part outside the dotted line) may exist excessively. The resulting adhering line may have excellent finishing, but the non-reactive adhesive liquid increases the processing cost. Since the boundary line of the range of high frequency heating is not the boundary line of the reaction of adhesive, the boundary of the reacted adhesive and non-reacted adhesive is not clear. Thus, the boundary of the bonding line is unclear, and thus the finishing is poor. The non-reactive adhesive liquid left after heat pressing may go through a curing reaction during subsequent processes or during the use of down products. However, this may further combine nearby fabrics or make the nearby down tangle, thereby causing poor products.

Drawing (d) in FIG. 8 shows the process of forming a bonding line (107) narrower than the pattern line (108) in case the pressing pattern is wider than the printing pattern (Wt>Wa). In this case, after heat pressing, most of the adhesive liquid is cured, and thus there is little non-reactive adhesive liquid left. However, the edge or boundary of the bonding line is not smooth and may be uneven. Also, there is relatively less adhesive available than required considering the pattern width, and thus part of the surface pattern line may be supported by the non-adhesive area (the part indicated by dotted circle at the right lower end and left upper end of the adhering line). If the inner bonding line (107) and surface pattern line (108) are not unified as such, the finishing of the pattern bonding line is poor and the quality (adhesiveness and durability) deteriorates.

Meanwhile, the differences between printing width of adhesive and pressing width of pressing tip and the resulting finishing quality due to them can be explained from the attached FIGS. 5, 6 & 7. Prior art references suggest technologies bonding fabrics or adhering or forming a film on the fabric surface by coating or adhering an adhesive or hot melt on the fabric and heat pressing it with a roller or press. However, this is the same as the case where the pressing pattern is wider than the printing pattern (Wt>Wa) in Drawing (d) in FIG. 8. Thus, the same or similar problems may be raised.

In conclusion, it is preferable that the pressing pattern and printing pattern have a similar shape and are substantially the same in size. The pressing pattern and printing pattern are actually formed in a pressing pattern embossed on the pressing means and in a printing pattern carved in the printing device. Thus, the pressing pattern of the pressing means (e.g., pressing tip of the pressing roller) and printing pattern of the printing means (e.g., groove of the printing roller) are the same in pattern, and the difference in pattern width is within 20%, preferably within 10%, and more preferably within 5%.

In general, the tensile strength of a bonding line formed by a high frequency heating can vary depending on the type of adhesive, amount used, thickness of bonding line, type of fabric. With regard to a double fabric having a bonding pattern line for compartment separation formed according to the present invention and down products using the double fabric, a bonding line with a width of 2~10 mm can represent a tensile strength of about 1~20 Kgf, particularly 1.2~18 Kgf, and preferably 1.5~15 Kgf.

According to an embodiment of the present invention, a bonding line with a 6 mm width can represent a tensile strength of at least about 2.8 Kgf, and preferably at least 3.8 Kgf in case of a common fabric and a common down-proof fabric, and a tensile strength of at least 1.8 Kgf, preferably at least 4.0 Kgf, and particularly at least 6.0 Kgf in case of a functional fabric although it can vary depending on coating fabric or laminating fabric.

The tensile strength of a compartment separation line made in a conventional sewing manner is approximately 1~4 Kgf but can vary depending on the types of sewing thread and fabric. By comparison, the range of the tensile strength of the compartment separation line according to some embodiments of the present invention is not low and can even be more excellent.

For some laminating fabric, the adhesiveness between the fabric body and laminated film is lower than the tensile strength of the bonding line formed by high frequency heating, and thus the effect of excellent tensile strength according to the present invention cannot be exerted sufficiently. However, since there are many other disadvantages when bonding the fabric by sewing method, the high frequency bonding method of the present invention would also be applied to this fabric more advantageously.

The double fabric having a bonding pattern line for compartment separation formed according to the present invention and the down products using the double fabric have an excellent resistance against a shearing force and thus have an excellent washing durability. When the products manufactured according to the present invention are subjected to a washing test commonly performed in order to verify the durability of a functional fabric product, it has been confirmed that there is no damage such as separation, release, or the like from the bonding area even after performing 10 times, 20 times and 30 times washing processes in which one washing process is composed of a washing for 40 minutes and a spin-drying for 40 minutes.

The present invention can be applied to clothing and bedding which have compartments for separately filling with down (front breast feathers of duck or goose), fur, feathers or the like, and the preparation thereof. Specifically, mention can be made of down clothing and down bedding, and particularly, jackets, pants, blankets, pillows, sleeping bags, paddings, featherbeds or the like without any limitation.

In general, down refers to down hair growing next to feathers of water bird, which grows in the breast, lower stomach, lower neck, or below wings of a water bird. Down can be found only in water birds. It constitutes less than 10% of the total feathers of a water bird, and thus has a disadvantage of being expensive. However, nowadays, the breeding of ducks has been generalized to obtain down, and thus down can be purchased at a relatively cheaper price.

Down is the most loved natural material thanks to its advantages of being the lightest and warmest. Down is warm, not because of the fiber itself, but it has heat insulation because it contains a great amount of still air film in the structure of fibers. However, since down has short fiber length and is weak, it cannot be woven. Thus, it cannot be used as clothing by itself, and it can be used only as a filling material that fills the inside of an outer fabric. Filling materials of down products sold in the market can be largely classified into duck down and goose down. The reason down products generally refer to products made of duck down is because duck down takes the lion's share of down products. Recently, goose down is widely being used.

The function of down is to allow each bunch of down to contain a large amount of air, so as to have excellent heat insulation, and thus to maintain body temperature whether at high temperature or low temperature. Also, it prevents excessive moisture from passing through the clothes to the body and can have water resistance against moisture.

Thus, the representative characteristics of well processed down are: (1) being lighter than natural and artificial cotton, (2) being the warmest natural insulating material found until now, (3) having a good elasticity, and (4) being hygienic thanks to naturally exerting functions of shrinking, expanding, moisture absorbing, damp-proofing, water-proofing, or the like depending on the change in the surroundings.

As types of down, there are white duck down, grey duck down, white goose down and grey goose down. If the content of down is less than 50%, the product is classified as feather products. That is, not all down parkas are made of 100% down, and in fact, the down content of down parka products sold in the market is less than 80% in average.

Figure 9:
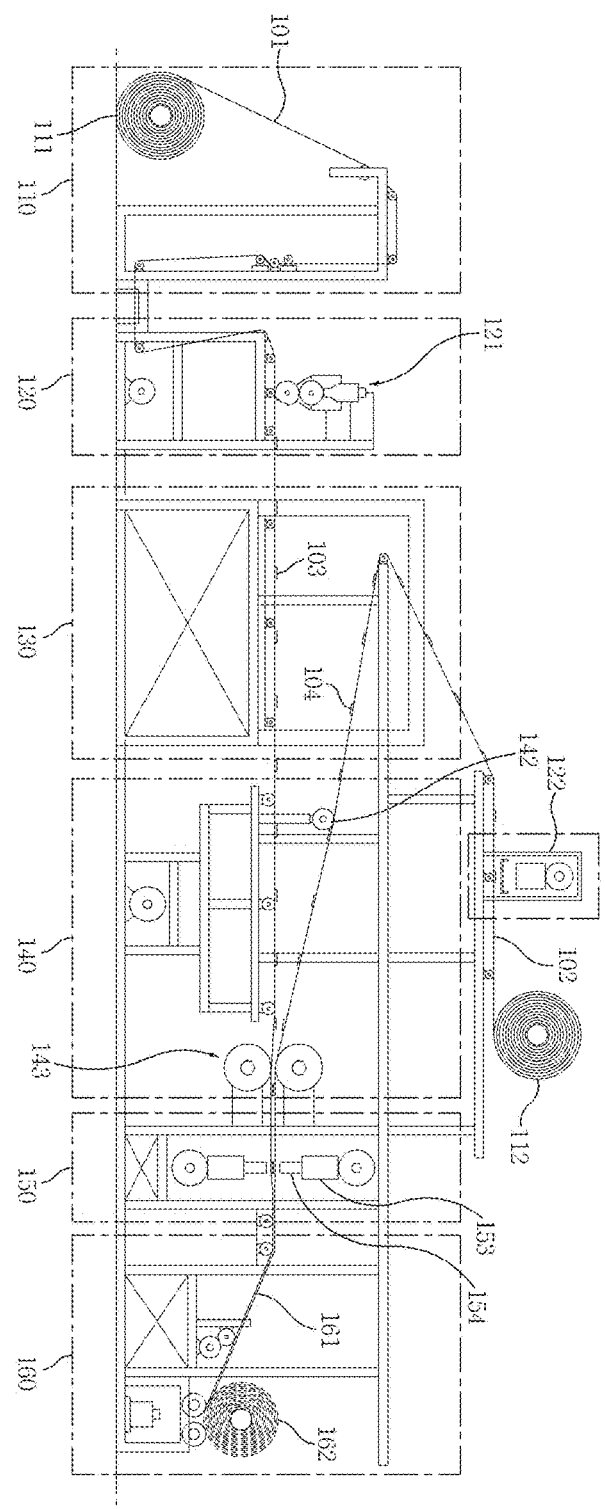
FIG. 9 is a drawing illustrating an example of a manufacturing device which can carry out the present invention.

Hereinafter, the method for preparing double fabric for down products and the preparation device according to the present invention will be explained in more detail. The double fabric for down products according to the present invention can be prepared by using the preparation device illustrated in FIG. 9. The preparation device in FIG. 9 is an example for explanation, and some embodiments of the present invention are not limited to the preparation device. The preparation device in FIG. 9 typically comprises an introducing means (110), a printing means (120), a drying means (130), a laminating means (140), a bonding means (150), and a winding means (160). The role and/or function of each device are provided as follows:

The introducing means (110) is a means connecting the inner fabric roll (111) and outer fabric roll (112) to the introducing part of the conveyer type or roller type process line so that the fabric can be introduced continuously to the process line.

The printing means (120) is a means for printing an adhesive on the fabric in a predetermined printing pattern, and can be selected from a stamping printing means, pressing press printing means, roller printing means or screen printing means, etc. The printing pattern is carved or embossed, preferably carved on the stamp, press or roller, and a printing pattern is drawn on the screen. The printing means can be installed on the first fabric (outer fabric) and second fabric (inner fabric) constituting the double fabric. The adhesive is printed on either one of the first fabric and second fabric or on both of them. FIG. 9 illustrates a printing means (121) of an inner fabric in the roller printing method and a printing means (122) of an outer fabric in the screen printing method.

Also, the adhesive (103) printed on the inner fabric and adhesive (104) printed on the outer fabric are here illustrated as being printed on the upward facing surfaces of the inner fabric (101) and outer fabric (102) moving horizontally. However, this is only for convenience, and the adhesive liquid may be printed on the downward facing surface of the fabric or on the fabric moving vertically or obliquely, if necessary. In such case, it would be preferable for the adhesive liquid to have a viscosity to an extent not to flow down.

Figure 10:
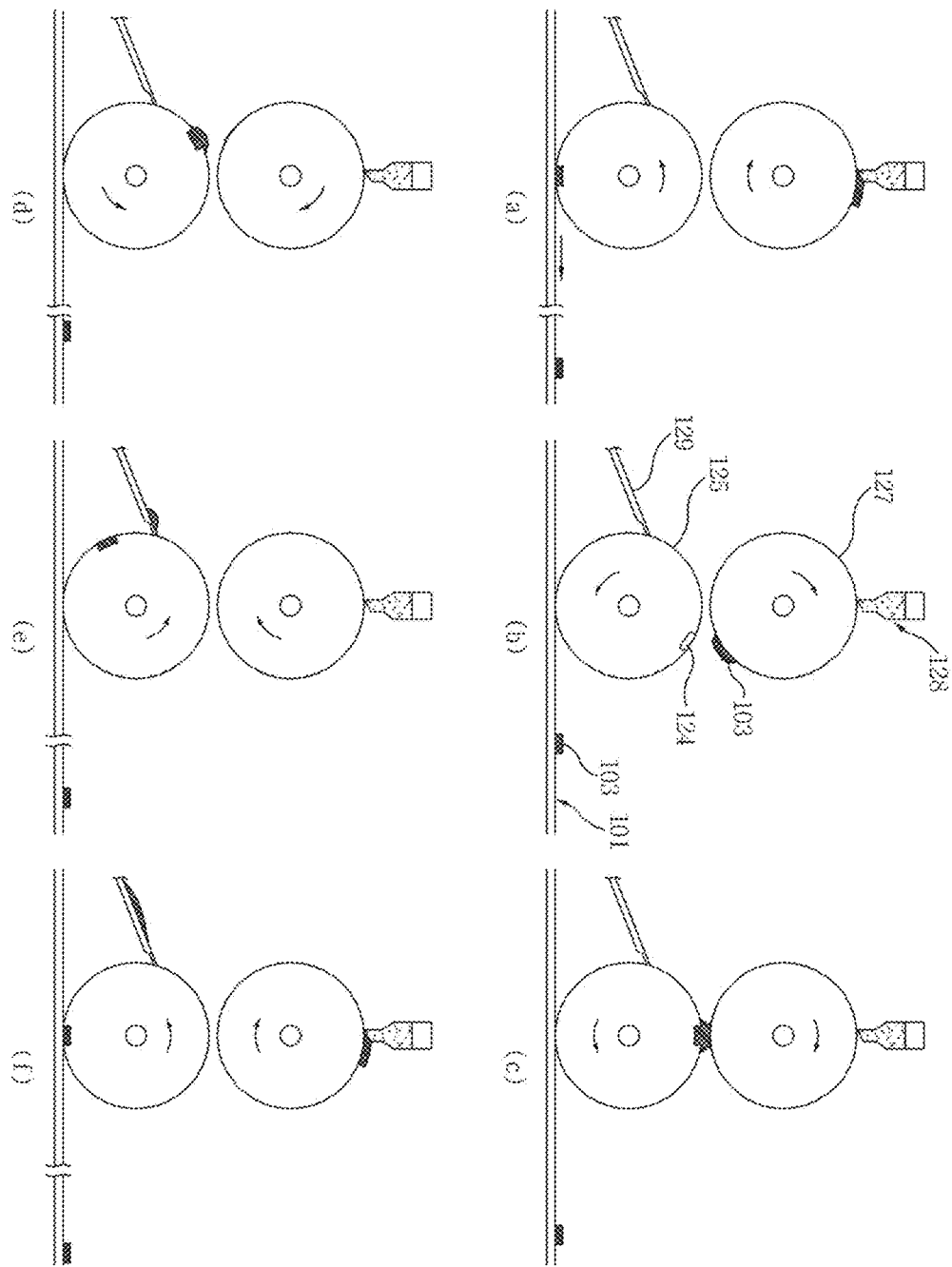
FIG. 10 is a drawing illustrating a process of printing an adhesive on a fabric in order according to the roller printing technology.

As a printing device for the inner surface, a roller printing device (121) can be exemplified and a printing method using the same is illustrated in FIG. 10. As illustrated in FIG. 10, the roller printing device (121) basically comprises an adhesive liquid supplier (128), a release roller (127), a main roller (125) and a guide knife (129). The adhesive liquid (103) is supplied from the adhesive liquid container (128) to the release roller (127) [see Drawing (a)], and then delivered to a groove (124) of the main roller (125) with a printing pattern carved on it [see Drawings (b) and (c)]. The adhesive liquid delivered to the groove (125) of the main roller is transferred to the fabric surface when being in contact with the fabric [see Drawings (d), (e) and (f)]. The adhesive liquid (103) printed on the fabric is dried with a subsequent drying device and then fixed on the fabric. The roller printing device (121) may further comprise a guide knife (129) for removing ink which is smudged outside the groove (124) (concave part of the printing pattern) of the main roller.

A screen printing device (122) is illustrated in FIG. 9 as a printing device for outer fabric, and such screen printing device (122) may comprise an adhesive liquid supplier, a screen, and a brush. In such screen printing device, an adhesive liquid is supplied from the adhesive liquid supplier to the screen, and then the adhesive liquid is coated on the fabric along the pattern drawn on the screen when the screen is brushed with a brush when the screen is in contact with the fabric. Thus coated adhesive liquid (104) can be dried at the subsequent drying device (130) to fix on the fabric.

At the drying means (130), the adhesive liquid printed on the fabric is dried. The adhesive should be attached on a fabric by being dried or solidified to a proper level so that the adhesive is not sticky or its pattern is not distorted during a laminating. In the drying step, the viscosity of the adhesive liquid adhered to the fabric surface can be decreased due to a high drying temperature, and thus the adhesive liquid can permeate more into the fabric and can be solidified therein. The inner fabric and the outer fabric may be dried at the same or different drying means. FIG. 9 illustrates that the drying of the inner fabric and the drying of the outer fabric are carried out at the same drying means, but is given only as an example and some embodiments of the invention are not limited thereto. Drying can be carried out by heating, air blast, UV irradiation, or a combination thereof, but a heating element (e.g. heating filament), ventilator, luminous body or the like for them is not specifically illustrated in FIG. 9. According to a preferable embodiment of the present invention, the drying means can be selected from the tenter.

The laminating means (140) is a means that laminates fabrics by closely contacting an inner fabric with an outer fabric. For example, the inner fabric is closely contacted and laminated with the outer fabric so that the printing pattern of the inner fabric is contacted and coincided with the printing pattern of the outer fabric.

The above laminating means may further comprise a first alignment means (a means for adjusting the fabric location) for aligning the printing pattern of the inner fabric to be coincided with the printing pattern of the outer fabric during the process of closely contacting and laminating a first fabric (or a lower fabric or an inner fabric) and a second fabric (or an upper fabric or an outer fabric). In the present invention, the alignment for coinciding the printing pattern of an inner fabric with the printing pattern of an outer fabric can be achieved by adjusting the fabric location and/or the conveying speed. As such means, mention can be made on a variable roller means (142), a fabric speed controlling means, or the like. The variable roller (142) is in contact with the fabric at the fabric convey path, and the fabric path can be changed by moving the position up and down. In this way, the relative locations of the adhesives attached to the inner fabric and the outer fabric can be adjusted.

In general, the adjustment of the fabric delivery speed can be achieved by adjusting the speed of the printing process, the drying process, or the like. In such case, however, a problem may occur that it is required to adjust the delivery speed of fabric throughout the process line. Therefore, it can be easier or more efficient to align the location of the fabric by adjusting the delivery path rather than controlling the delivery speed.

The operation of the first alignment means employing a variable roller (142) can be explained as follows. For example, when an adhesive (103) attached to an inner fabric (101) is introduced into a laminating device slightly behind an adhesive (104) attached to an outer fabric (102), the moving speed of the outer fabric (102) can be slightly slowed down as a whole. Alternatively, the variable roller (142) located on the delivery path of the outer fabric can be moved upwardly to make the delivery path of the outer fabric (102) longer, and thereby the location of the adhesive (104) of the outer fabric can be adjusted backward. As a result, the pattern of the inner fabric and the pattern of the outer fabric can coincide with each other.

The first alignment means (the means for adjusting the fabric location) may further comprise, for example, a means for measuring the relative locations of adhesives attached to the inner fabric and outer fabric, and a means for adjusting the fabric delivery speed or fabric delivery path so that the relative locations are consistent or coincided. By controlling the means for measuring the relative locations in relation with means that can adjust a fabric delivery speed and/or a fabric delivery path, it is possible to automate, as well as to perform more accurately, the above alignment process.

Meanwhile, when a reinforced material (e.g., a mesh material) is employed, the introducing means, printing means, drying means and laminating means as well as their operating manners can be suitably modified or complemented.

The reinforced material can be continuously furnished by using a fabric roll (not shown) for a reinforced material, or can be inserted at a determined position by using an inserting means (not shown) for a reinforced material which can insert a cut portion of reinforced material between an inner fabric and an outer fabric.

The positions of a fabric roll (not shown) for a reinforced material and an inserting means (not shown) for a reinforced material are not particularly fixed or restricted. The fabric roll for a reinforced material should be positioned so that the reinforced material can be inserted in a continuous manner between an inner fabric and an outer fabric, and the inserting means for a cut reinforced material can be located preferably between a drying means and a laminating means.

For example, it is possible to use a mesh material (not shown) and a drying means (not shown) for a mesh means to firstly prepare an adhesive-fixed mesh material, which can be inserted between an outer fabric and an inner fabric in a continuous or discontinuous manner. When the adhesive-fixed mesh material is continuously inserted in a fabric form having a width similar to the inner or outer fabric, it is possible to carry out the laminating process simply by inserting between the inner fabric and the outer fabric. When the adhesive-fixed mesh material is cut in a suitable width and then discontinuously inserted, it can be inserted at a suitable position (that is, a position that a pattern bonding line is formed) between the inner fabric and the outer fabric by using an inserting means (not shown) for a reinforced material, and then subjected to a laminating process.

The bonding means (150) is a means that can press fabrics and cure the adhesive with a high-frequency heating to combine the fabrics, and can be operated by utilizing a pressing press means or a roller pressing means which has, on the surface, a pressing protrusion or a pressing tip with a predetermined pressing pattern.

The laminated fabric and the protrusion are each placed on the bonding means (150) so that the pressing pattern of the protrusion coincides with the printing pattern of the laminated fabrics. Then, the protrusion is advanced toward the fabric and the fabric is pressed, and simultaneously the fabrics are bonded by curing the adhesive with high frequency heat.

According to a preferable embodiment of the present invention, the bonding means (150) may comprise a second alignment means (not shown) which can control the location of the fabric and/or protrusion so that the printing pattern of the adhesive coincides with the pressing pattern of the protrusion. The second alignment means may comprise a means controlling the delivery speed of laminated fabric, location of protrusion, roller speed, etc.

The location of the printing pattern of the laminated fabric can be slightly changed by controlling the location by a variable roller (not shown) or controlling delivery speed. Controlling the delivery speed of the laminated fabric has a problem that the delivery speed of the fabric should be changed throughout the entire process line. Thus, it is easier to control the location of the printing pattern on the laminated fabric by changing the location of the fabric laminated by a variable roller.

Meanwhile, the printing pattern can be made to coincide with the pressing pattern by controlling the location of the pressing pattern. The location of the pressing pattern, to be specific, the location of the pressing tip or protrusion of the pressing roller or press can be controlled by changing their operation speed (i.e., rotation speed of roller or pressing speed of press), or their location (e.g., height). Controlling the operation speed and/or location of the roller or press would be the easiest and most efficient. Thus, the purpose of the second alignment means which aligns the fabric and pressing tip so that the printing pattern coincide with the pressing pattern can be achieved by controlling the location of fabric, location of pressing tip, delivery speed of fabric, operating speed of pressing tip, etc. Preferably, it can be achieved by controlling the location or operation speed of pressing tip.

The second alignment means may comprise an adhesive location measuring device and/or a heating tip location controlling device. They are controlled by a computer to perform the alignment process more precisely, making it possible to automate the alignment process.

The first alignment means and second alignment means can use a technology and device that are similarly used in a printing technique for printing two or more colors in the field of printing, for example, a three-color printing technique printing in three colors, or a four-color printing technique printing in four colors.

According to an embodiment of the present invention, the printing pattern and pressing pattern may overlap each other in pattern (shape) with respect to the pattern center line. The difference in size (width) is 20% or less, and preferably 10% or less.

The winding means (160) refers to a means winding the double fabric (161) prepared continuously in the form of a roll (162) after going through a cooling process. However, it is not necessarily limited to the form of a winding roll, and double fabrics can be collected in any form suitable for delivery. The double fabric prepared in the bonding process is collected as it is or in the form of a roll or something else, so as to be immediately delivered to the subsequent down product preparing process, for example, marking and cutting process.

Meanwhile, the process of preparing double fabrics for preparing down products in the preparation device shown in FIG. 9 can be explained in order as shown below, starting from the inner fabric and outer fabric. The inner fabric (101) is unwound from the inner fabric roll (111) and supplied to the printing means (120). The inner fabric printing device (121) of the printing means (120) is illustrated in FIG. 9 according to a roller printing technique. The adhesive liquid (103) is printed in a predetermined printing pattern on the inner surface of the inner fabric (101) provided. The inner fabric (101) printed with adhesive liquid (103) is delivered to the drying means (130) such as tenter and dried at a predetermined temperature for a predetermined period of time.

Also, the adhesive liquid can be printed even on the outer fabric (102), and preferably, the adhesive liquid is printed in the same printing pattern as the inner fabric. The adhesive liquid is printed in a predetermined printing pattern by the outer fabric printing device (122) on the inner surface of the outer fabric (101) unwound from the outer fabric roller (112). The outer fabric printing device (122) is illustrated as using the screen printing technique according to FIG. 9, but other printing means, for example, roller, press can be used. The outer fabric printed with adhesive liquid (103) is delivered to the drying means (130) such as tenter and dried at a predetermined temperature for a predetermined time.

The inner fabric (101) printed with adhesive liquid (103) and outer fabric (102) printed with adhesive liquid (104) are delivered to the laminating means (140) after being dried, and are laminated so that the printing pattern of the adhesive (103) coincides with the printing pattern of the adhesive liquid (104). In case there is a difference in the locations of the printing patterns, and they do not coincide with each other, the difference in printing patterns can be controlled by controlling the delivery speed of fabric, or controlling the delivery distance of the outer fabric using a delivery roller (142).

The inner fabric (101) and outer fabric (102) laminated so that their printing patterns coincide with each other are supplied to the high frequency bonding means (150), and high frequency heating is carried out while pressing the fabric with the pressing tip (154) of the high frequency bonding device (153) at the printing pattern, so that double fabric (161) can be prepared by bonding the inner fabric and outer fabric at a bonding line originated from the adhesive. The prepared double fabric (161) is wound to form a double fabric winding roll (162).

Figure 11A:
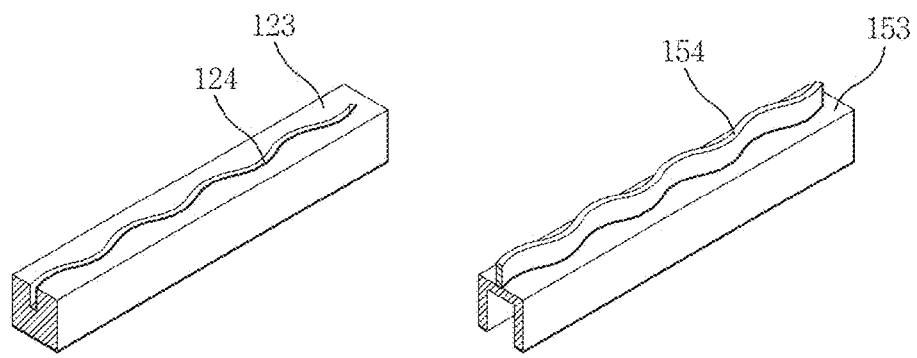
FIG. 11a is a drawing illustrating a press for printing in which a printing pattern is carved and a press for pressing in which a corresponding pressing pattern is protruded.
Figure 11B:
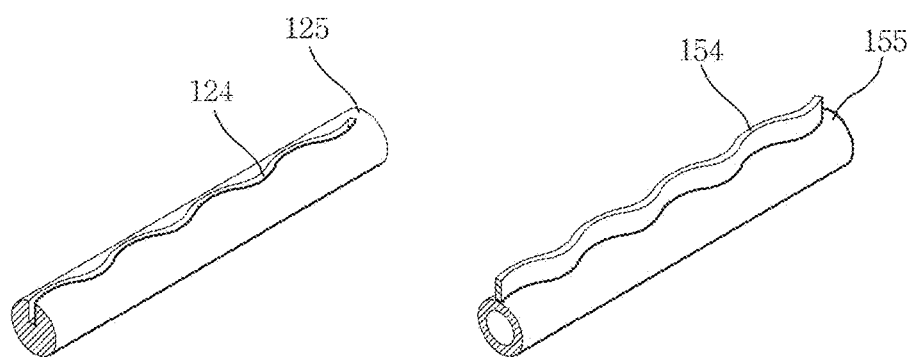
FIG. 11b is a drawing illustrating a roller for printing in which a printing pattern is carved and a roller for pressing in which a corresponding pressing pattern is protruded.

FIG. 11a is a drawing illustrating a press (123) having grooves (124) used in the printing means (130) and carved in a predetermined printing pattern, and a press (154) used in the high frequency bonding means (150) and formed with a protrusion (154) in the same pressing pattern as the printing pattern. FIG. 11b is a drawing illustrating the case where the printing means and bonding means in FIG. 11a have a roller, not a press. It shows a roller (125) with a groove carved (124) in it in a predetermined printing pattern and a roller (152) with a protrusion (153) embossed in the same pressing pattern as the printing pattern. In the press (123) and roller (125), the shaded areas on the left indicate sections cut, and both ends of the carved groove (124) may be closed (FIGS. 11a and 11b), or open.

In FIGS. 11a and 11b, the printing pattern of the carved groove (124) and pressing pattern of the protruded pressing tip (152) are the same in shape and size. To be specific, the pattern (shape) may overlap each other with respect to the pattern center line, and the difference in size (width) is 20% or less, and preferably 10% or less. The depth of the groove (124) and height of the pressing tip (154) do not correspond to each other, and may be selected independently. For example, the depth of the groove can be generally selected from 0.5~5 mm, and preferably from 1~3 mm, and the height of the protrusion can be selected from 1~30 mm, and preferably from 5~20 mm.

Figure 12:
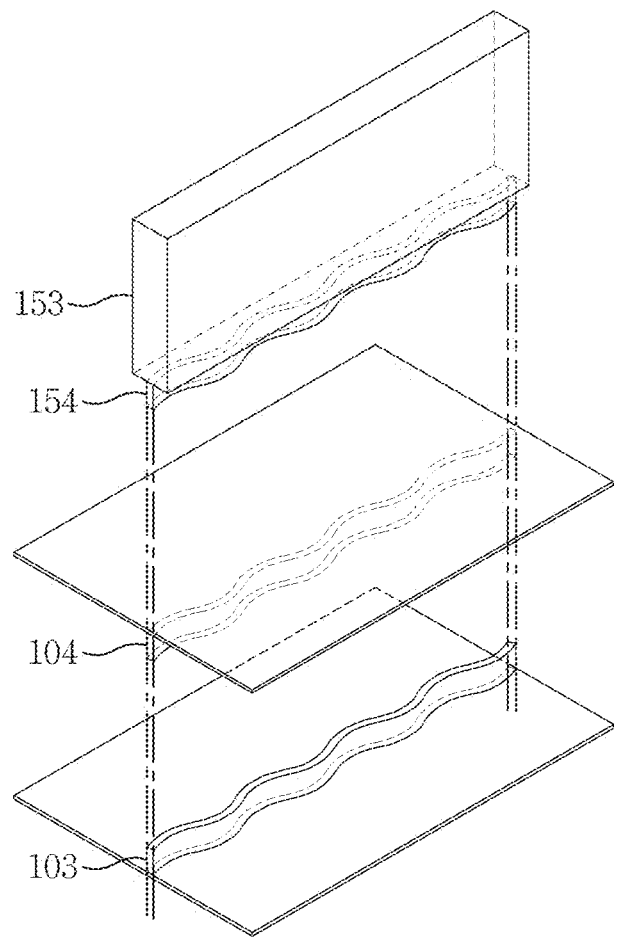
FIG. 12 is a conceptual diagram illustrating the concept of a printing pattern coinciding with a pressing pattern, which shows a condition that the pressing pattern of the protruded pressing tip, the printing pattern of the adhesive printed on an outer fabric, and the printing pattern of the adhesive printed on an inner fabric are aligned to coincide with each other.

FIG. 12 is a conceptual diagram illustrating the concept of a printing pattern coinciding with a pressing pattern, which shows a condition that the pressing pattern of the protruded pressing tip (154), the printing pattern of the adhesive (104) printed on an outer fabric (102), and the printing pattern of the adhesive (105) printed on an inner fabric (103) are aligned to coincide with each other.

Figure 13A:
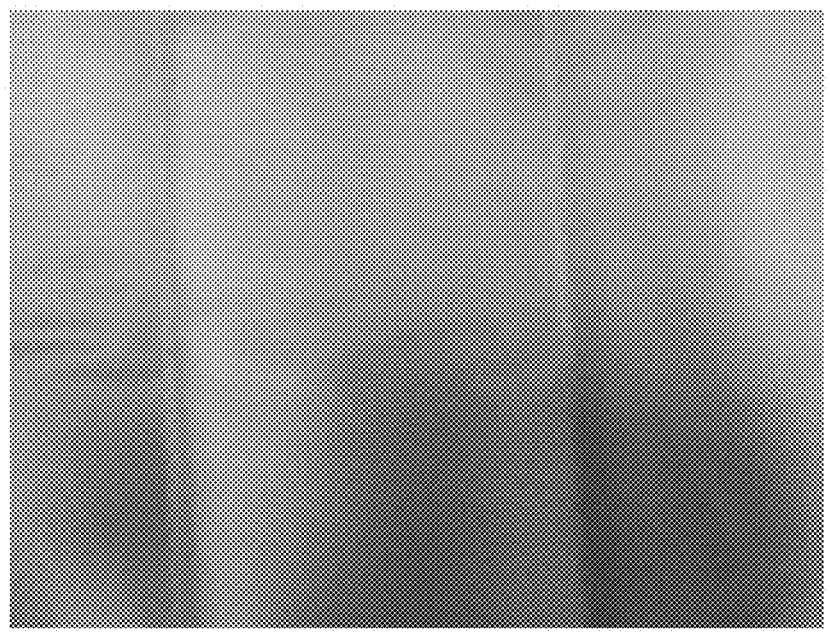
FIGS. 13a and 13b are photographs showing a bonding pattern line formed by the high frequency bonding technique according to the present invention; they respectively illustrate that patterns in the form of small nets and patterns in the form of large nets are continuously formed on the surface of the outer fabric.
Figure 13B:
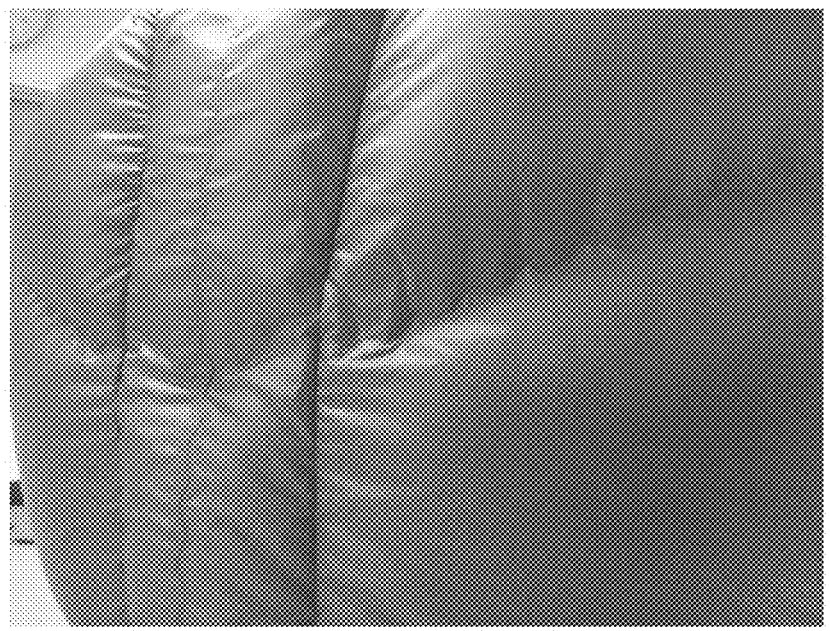

FIGS. 13a and 13b are photographs showing a bonding pattern line formed by the high frequency bonding technique according to the present invention; they respectively illustrate that patterns in the form of small nets and patterns in the form of large nets are continuously formed on the surface of the outer fabric.

Figure 14A:
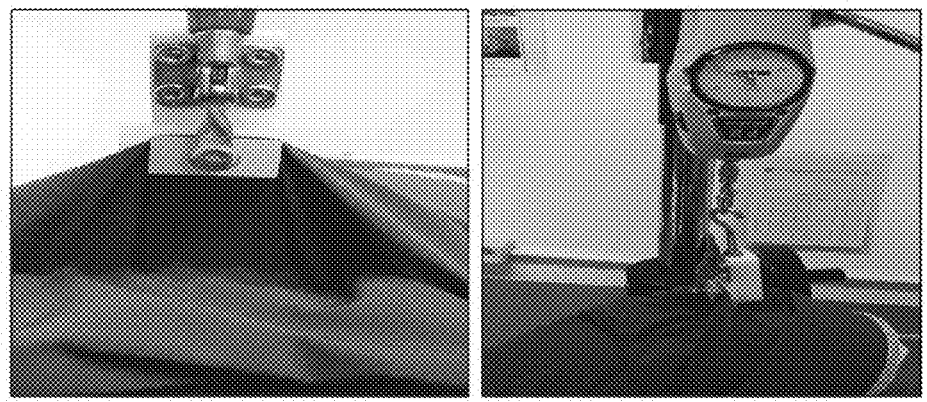
FIG. 14a is a drawing illustrating a manner of measuring the tensile strength of a bonding pattern line for compartment separation formed by the high frequency bonding technique.
Figure 14B:
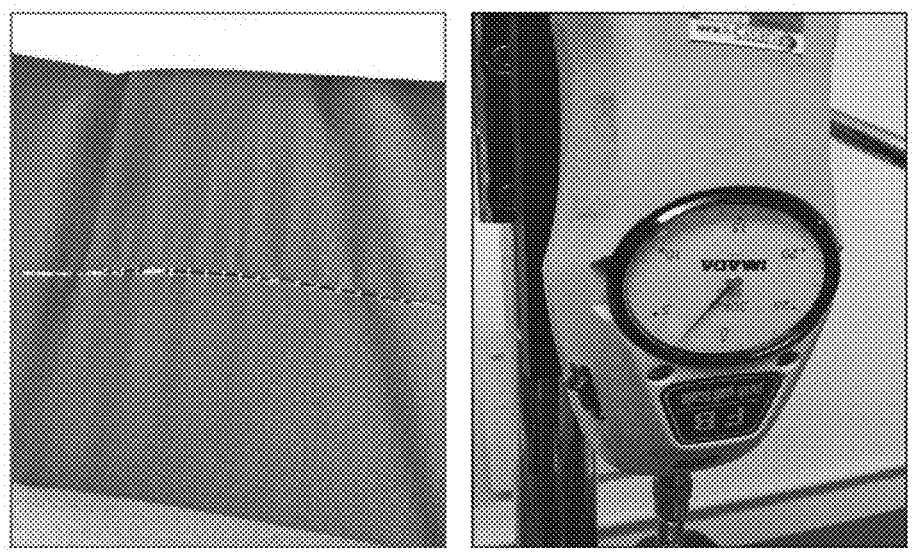
FIG. 14b is a drawing illustrating a manner of measuring the tensile strength of a sewing line for compartment separation formed by a sewing method.

FIG. 14a is a drawing illustrating a manner of measuring the tensile strength of a bonding pattern line for compartment separation formed by the high frequency bonding technique; and FIG. 14b is a drawing illustrating a manner of measuring the tensile strength of a sewing line for compartment separation formed by a sewing method.

FIG. 15 is a drawing illustrating the result of a washing test on a clothes piece of a down product filled with down wherein a bonding pattern line for compartment separation has been formed by the high frequency bonding technique.

Figure 16:
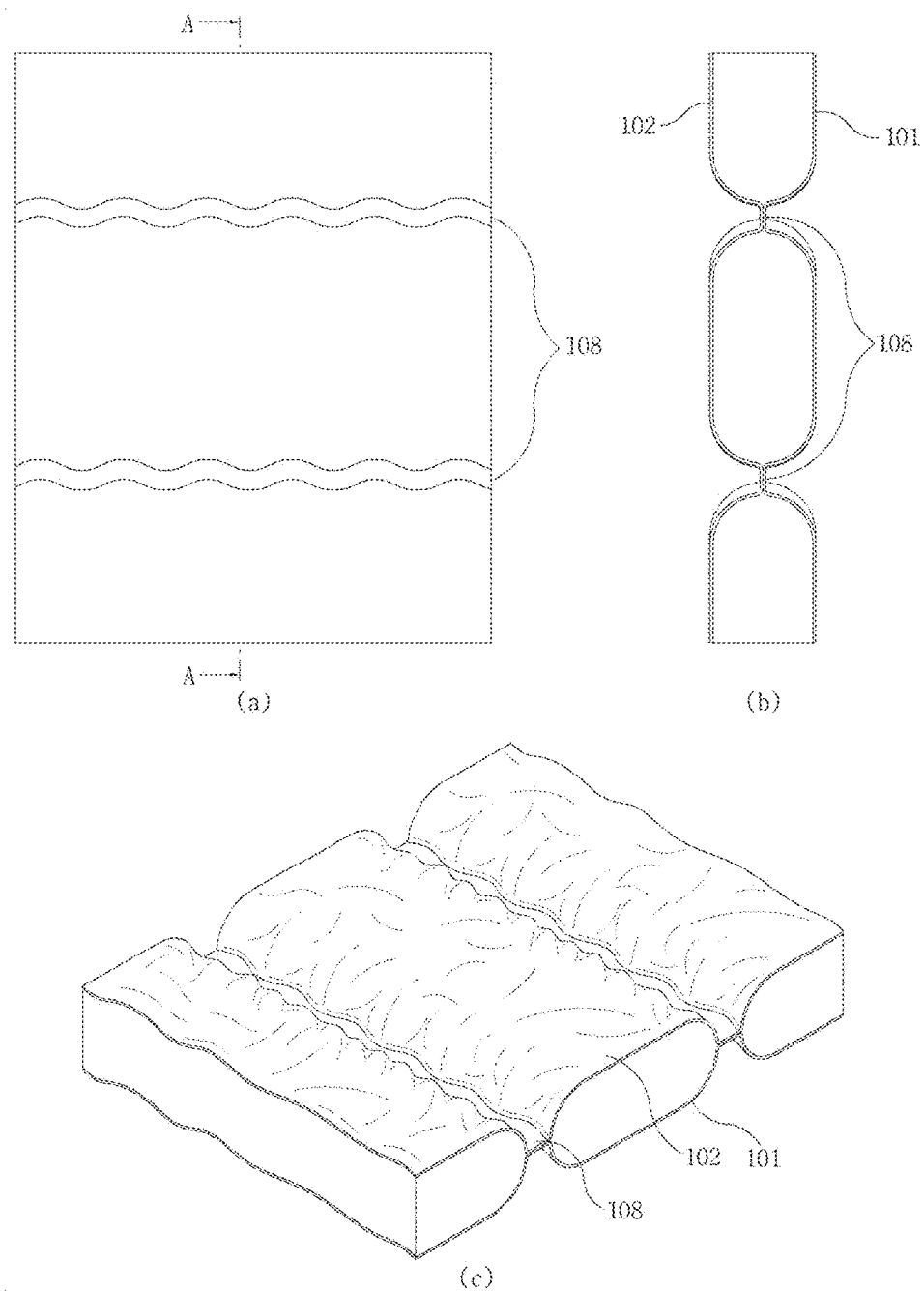
FIG. 16 is a drawing illustrating the surface and structure of a double fabric or down product having bonding pattern lines for compartment separation formed by the high frequency bonding technique; the drawing (a) shows an outer surface of a fabric on which a pattern line in the form of a tilde symbol (or a wave design) is formed; the drawing (b) is a sectional view showing the inner structure cut along the A-A cutting line; and the drawing (c) is an oblique view showing the overall shape of the fabrics around a pattern bonding line.

FIG. 16 is a drawing illustrating the surface and structure of a double fabric or down product having a bonding pattern line for compartment separation formed by the high frequency bonding technique; the drawing (a) shows an outer surface of a fabric on which a pattern line of a tilde symbol (or a wave design) is formed; the drawing (b) is a sectional view showing the inner structure cut along the A-A cutting line; and the drawing (c) is an oblique view of the overall shape of the fabrics around the pattern bonding line, showing in 3-dimension structures where the inner fabric (101) and the outer fabric (102) are connected and where they are not.

Figure 17:
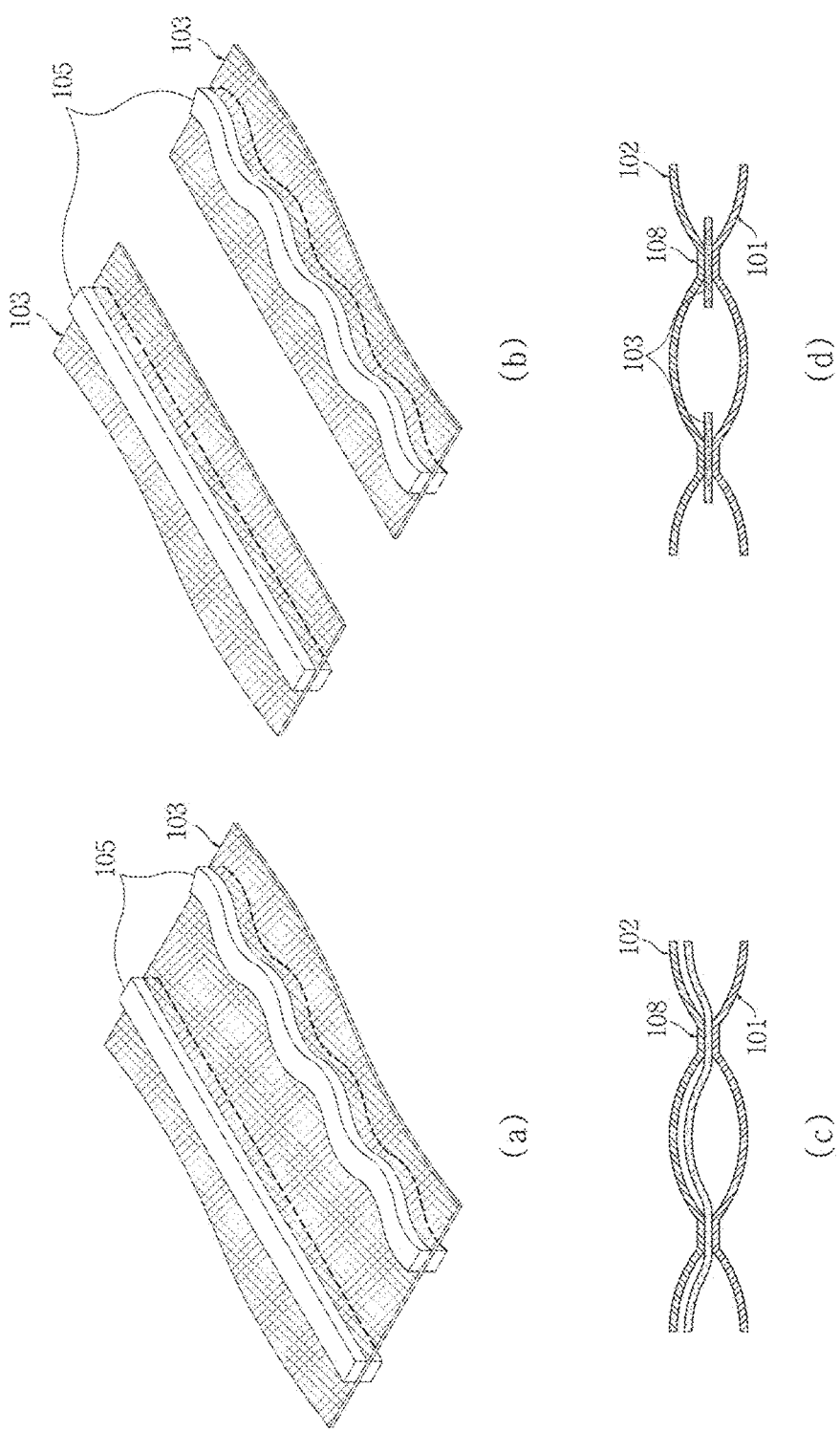
FIG. 17 is a drawing illustrating the structure of a bonding pattern line formed by using a reinforced material; the drawings (a) and (c) illustrate an adhesive-fixed reinforced material which is continuously inserted and a sectional structure of the pattern bonding line comprising the same; and the drawings (b) and (d) illustrate two adhesive-fixed reinforced materials which are discontinuously inserted and a sectional structure of the pattern bonding line comprising the same.

FIG. 17 is a drawing illustrating the structure of a bonding pattern line formed by inserting a reinforced material (103); the drawings (a) and (c) illustrate an adhesive-fixed reinforced material (103) which is continuously inserted and a sectional structure of the pattern bonding line (108) comprising the same; and the drawings (b) and (d) illustrate adhesive-fixed reinforced material (103) which is discontinuously inserted and a sectional structure of the pattern bonding line comprising the same.

According to the present invention, the printing means and pressing means can be selected from a combination of devices of the same type, i.e., from a combination of printing press-pressing press, or a combination of printing roller-pressing roller, and from a combination of devices of different types, for example, a combination of printing press-pressing roller, printing roller-pressing press, or printing screen-pressing press.

In the specification of the present invention, explanation on the method of carrying out the high frequency bonding process by printing an adhesive on both the inner fabric and outer fabric can be applied to the method of carrying out high frequency bonding process by printing the adhesive on only one of the inner fabric and outer fabric by properly modifying the process. Such modification can be easily understood by a person having ordinary skill in the art.

Hereinafter, the present invention will be explained in more detail with reference to the examples. The following examples are provided to explain the present invention, and they do not limit the present invention in any manner.

EXAMPLE 1

A double fabric for down products is prepared by using a down-proof fabric sold in the market as inner fabric and outer fabric.

An epoxy-type liquid adhesive was printed on the inner fabric made of a down proof fabric in a printing pattern of a width of 6 mm. The printing pattern is in the form of continuous tilde lines (~~~), or wave lines, and the interval between the printing patterns is about 10~20 cm. The resulting inner fabric is delivered to the tenter to dry the adhesive for about 30 minutes at about 100° C., and thereby to prepare an inner fabric with an adhesive-printing pattern fixed thereon.

An outer fabric made of a down proof fabric is processed in the same manner as above, thereby to prepare an outer fabric with an adhesive-printing pattern fixed thereon.

The inner fabric and the outer fabric thus prepared as above are laminated, with the printing pattern of the inner fabric coinciding with the printing pattern of the outer fabric.

The high frequency bonding process is carried out by using a high frequency heating roller having a pressing tip protruded in a pressing pattern that is the same pattern as the printing pattern. After placing the pressing tip so that the pressing pattern of the pressing tip coincides with the printing pattern of the fabric, the adhesive is heated and cured by irradiating a high frequency of 15 KHz for 4~5 seconds while pressing the fabric with the pressing tip.

It was confirmed that pattern lines are clearly formed at the same locations as the inner bonding lines on the surface of a double fabric obtained by the above high-frequency bonding (see FIGS. 13a and 13b).

The tensile strength of the inner bonding line for compartment separation of the thus obtained double fabric was measured by using a push-pull gauge (FB push-pull scale; Imada, Japan) until the bonding portion was isolated and an average tensile strength of 3.8 kg was obtained through several measurements (see FIG. 14a).

COMPARATIVE EXAMPLE 1

A double fabric in which both of the bonding line for compartment separation and the surface pattern line are formed with sewing lines is manufactured by combining an inner fabric and an outer fabric by sewing with a polyester mixed sewing thread generally employed in the sewing of down products. The interval of sewing holes (needle holes) of the sewing line is 0.5 cm.

The tensile strength of the inner bonding line for compartment separation of the above obtained double fabric is measured in the same manner as in example 1, and the measured tensile strength is 3.5 kg (see FIG. 14b).

EXAMPLES 2~3

Except that the printing pattern and the pressing pattern have a width of 2 mm (Example 2) and 4 mm (Example 3), respectively, the examples 2 and 3 proceed in the same manner as in Example 1, to prepare a double fabric having bonding lines for compartment separation and surface pattern lines.

The compartment separation line of the double fabric has a tensile strength of at least 1.8 kg, and no separation of bonded areas, or seams, was shown during the washing test carried out at least 30 times (for each time: 40 minutes of washing and 40 minutes of spin-drying).

EXAMPLE 4

Except that a normal breathable fabric sold in the market is used as inner fabric and outer fabric, the example similarly proceeds as in Example 1, to prepare a double fabric having bonding lines for compartment separation and surface pattern lines.

Down products are prepared by marking and cutting the double fabric, finishing, introducing down, and closing the down inlet by carrying out a overlock finishing.

The compartment separation line of the down product has a tensile strength of at least 1.8 kg, and the bonding line was not broken or bonded areas were not separated even after carry out a washing test (for each time: 40 minutes of washing and 40 minutes of spin-drying) 10 times, 20 times and 30 times, respectively (FIG. 15b).

EXAMPLE 5

Except that Gore-Tex fabric [Product name: Gore-Tex®; Company name: W.L. Gore & Associates], which is a breathable coating fabric, is used as inner fabric and outer fabric, the example similarly proceeds as in Example 1, to prepare a double fabric having bonding lines for compartment separation and surface pattern lines, and to manufacture down products using the double fabric.

The compartment separation line of the double fabric has a tensile strength of at least 4.3 kg, and the bonding line was not broken or bonded areas were not separated even after carrying out a washing test (for each time: 40 minutes of washing and 40 minutes of spin-drying) 10 times, 20 times and 30 times, respectively (see FIG. 15a).

EXAMPLE 6

Except that a stretch breathable coating fabric sold in the market is used as inner fabric and outer fabric, the example proceeds in the same manner as in Example 1, to prepare a double fabric having bonding lines for compartment separation and surface pattern lines, and to manufacture down products using the double fabric.

The compartment separation line of the double fabric has a tensile strength of at least 9.4 kg, and the bonding area was not separated even after carrying out a washing test at least 30 times (for each time: 40 minutes of washing and 40 minutes of spin-drying) (see FIG. 15c).

EXAMPLE 7

Except that a liquid adhesive is printed and dried on an inner fabric and an outer fabric and then a mesh fabric (having a width similar to that of the inner or outer fabric) is continuously inserted between the inner fabric and outer fabric and then laminated together, the example proceeds in the same manner as in Example 1, to prepare a double fabric having at least one mesh-reinforced pattern bonding line composed of a bonding line for compartment separation and a surface pattern line, and to manufacture down products using the double fabric.

EXAMPLE 8

Except that a liquid adhesive was printed and dried on an inner fabric and an outer fabric and a mesh fabric (having a length similar to the width of a fabric and a width of about 3~4 cm) is inserted at the location that the adhesive is fixed between the inner fabric and outer fabric, the example proceeds in the same manner as in Example 5, to prepare a double fabric having at least one mesh-reinforced pattern bonding line composed of a bonding line for compartment separation and a surface pattern line, and to manufacture down products using the double fabric.

EXAMPLE 9

A liquid adhesive is not printed on an inner fabric and an outer fabric, but printed and dried on a mesh fabric in a predetermined pattern with an interval of 10 cm to give an adhesive-fixed mesh fabric, which is cut with a width of 10 cm. The resulting adhesive-fixed mesh fabric bands have a length similar to the width of the inner or outer fabric and a width of 10 cm, and their printed pattern lies at the middle of the width 10 cm. The resulting adhesive-fixed mesh fabric bands are inserted at a determined location between the inner fabric and the outer fabric and then subjected to a laminating process.

The high frequency bonding process is carried out by using a high-frequency heating roller having a pressing tip protruded in a pressing pattern that is the same pattern as the printing pattern. After placing the pressing tip so that the pressing pattern of the pressing tip coincides with the printing pattern of the mesh fabric which is inserted between the inner fabric and the outer fabric, the fabrics are pressed by the pressing tip, while irradiated with a high frequency of 15 KHz for 5~6 seconds to heat and cure the adhesive, thereby to prepare a double fabric having a mesh-reinforced pattern bonding line.

It is confirmed that pattern lines are clearly formed at the same locations as the inner bonding lines on the surface of the double fabric obtained by the above high-frequency bonding, and that the tensile strength of the mesh-reinforced pattern bonding line is better than that of a pattern bonding line which is not reinforced with a mesh.

COMPARATIVE EXAMPLES 2~3

A double fabric for down products is prepared by using a down proof fabric as inner fabric and outer fabric and using a polyurethane-type hot melt and polyester-type hot melt as adhesives, respectively.

The polyurethane hot melt film or polyester-type hot melt film sold in the market is cut in a straight line having a width of 1 cm, and attached to the inner surface of an inner fabric at an interval of 10 cm, and an outer fabric where a hot melt is not attached is laminated thereon.

With regard to the inner fabric and outer fabric laminated, the high-frequency bonding process is carried out as described below by using a high-frequency heating roller having a pressing tip protruded in a predetermined pressing pattern.

After locating the pressing tip so that the pressing pattern of the pressing tip coincides with the hot melt adhering area of the fabric, the adhesive goes through heat melting by irradiation of a high frequency of 15 KHz for 4~5 seconds while pressing the fabric with the pressing tip, and then cooling it. It is confirmed that a pattern line is formed at the same location of the inner bonding line on the surface of the double fabric obtained by the high frequency bonding, and the tensile strength of the compartment separation line is measured in the same manner as in Example 1.

When the double fabrics was subjected to washing tests) at least 30 times (for each time: 40 minutes of washing and 40 minutes of spin-drying, the bonded areas, or seams, were partly separated or came apart.

INDUSTRIAL APPLICABILITY

The present invention can be industrially used in the industry of clothing, bedding and sewing, and particularly, can be usefully utilized in the field of producing down products such as down jacket, down bedding, etc.

DESCRIPTION ON REFERENCE NUMERALS

110: an introducing means
120: a printing means
130: a drying means
140: a laminating means
150: a bonding means
160: a winding means
101, 102: an inner fabric and an outer fabric
111, 112: an inner fabric roll and an outer fabric roll
103, 104, 105: adhesive
107, 108: a bonding line (cured adhesive) and its pattern line
121, 122: an inner fabric printing device an outer fabric printing device
123, 125: a printing press and a printing roller (main roller)
127, 129: a release roller and a guide knife
153, 155: a pressing press and a pressing roller
124: grooves (intaglio)
154: protrusion (pressing tip)
142: a variable roller
143: a laminating roller
161: a double fabric
162: a double fabric winding roll

What is claimed is:

1. A down product comprising at least one bonding pattern line for compartment separation which is composed of an inner bonding line formed between an inner fabric and an outer fabric and a surface pattern line formed on the outer surface of the inner fabric or the outer fabric, characterized in that:
    said inner bonding line is formed on the inner surfaces of the inner fabric and the outer fabric by fixing said heat-reactive adhesive on the surface of the inner or outer fabrics in a predetermined printing pattern, drying the heat-reactive adhesive, and performing a high-frequency heating and curing on the adhesive, and thus combining said fabrics with the reacted and cured adhesive, said surface pattern line is formed on the surface of the outer fabric by pressing said inner fabric and outer fabric together in a predetermined pressing pattern during the high-frequency heating to cause a difference in surface texture, wherein the inner bonding line issued from said printing pattern and the surface pattern line issued from said pressing pattern are the same in pattern (shape) and have a width difference of 10% or less, and wherein said surface pattern line is substantially unified with the inner bonding line by the adhesive oozed onto or near to the surface of the outer fabric during the high frequency heating and curing.

2. The down product according to claim 1, characterized in that the printing pattern and the pressing pattern each have a width of 1~20 mm.

3. The down product according to claim 1, characterized in that said adhesive is an epoxy-type adhesive.

4. The down product according to claim 1, characterized in that a reinforced material is intercalated between an inner fabric and an outer fabric, and said reinforced material is comprised in a continuous manner between adjacent pattern bonding lines or in a discontinuous manner around pattern bonding lines.

5. The down product according to claim 4, characterized in that the reinforced material is selected from mesh-type reinforced materials which have a mesh thread thickness of 0.01~2 mm and a mesh eye size of 0.1~5 mm.

6. The down product according to claim 4, characterized in that the reinforced material is selected from reinforced materials on which an adhesive is printed and dried in a predetermined pattern.

7. A method of manufacturing a down product in which at least one bonding pattern line for compartment separation is formed by high-frequency bonding an adhesive between an inner fabric and an outer fabric, comprising:
  (1) a preparing step of preparing an inner fabric and an outer fabric,
  (2) a printing step of printing a heat-reactive liquid adhesive in a predetermined printing pattern on the inner surface of the inner fabric or on the inner surface of the outer fabric,
  (3) a drying step of drying the liquid adhesive printed on the inner surface of the inner fabric or on the inner surface of the outer fabric,
  (4) a laminating step of laminating the inner fabric and the outer fabric, and
  (5) a high-frequency bonding step of high-frequency heating and simultaneously pressing both the laminated inner and outer fabrics in a pressing pattern which is the same with said printing pattern to form the bonding pattern line.

8. The method of manufacturing a down product according to claim 7, characterized in that, at the printing step (2), a liquid adhesive is printed in a same printing pattern on an inner fabric and an outer fabric, and at the drying step (3), the printed liquid adhesive is dried, and at the laminating step (4), the inner fabric and the outer fabric are laminated so that the printing pattern of the inner fabric is coincided with the printing pattern of the outer fabric.

9. The method of manufacturing a down product according to claim 7, characterized in that said printing pattern has a width of 1~20 mm.

10. The method of manufacturing a down product according to claim 7, characterized in that said printing pattern and pressing pattern are the same in pattern shape and have a width difference of 10% or less.

11. The method of manufacturing a down product according to claim 7, characterized in that the printing of a liquid adhesives is carried out by a printing technology selected from a group consisting of a stamping printing technology, a pressing press printing technology, a roller printing technology or a screen printing technology.

12. The method of manufacturing a down product according to claim 7, characterized in that said liquid adhesive has a viscosity of 1~500 mPa.s.

13. The method of manufacturing a down product according to claim 7, characterized in that said liquid adhesive further comprises a curing agent, a diluent or a retardant in an amount of 5~15% w/w.

14. The method of manufacturing a down product according to claim 7, characterized in that said adhesive is an epoxy-type adhesive.

15. The method of manufacturing a down product according to claim 7, characterized in that, at the step (3), the drying is carried out to an extent that the adhesive is not transferred even when the inner fabric and the outer fabric come into contact with each other or are rubbed against each other.

16. The method of manufacturing a down product according to claim 7, characterized in that, at the step (3), the drying is carried out at a temperature of 50~100° C. and for a period of 1 min~60 min.

17. The method of manufacturing a down product according to claim 7, characterized in that, at the step (5), said high-frequency bonding is carried out by using a high-frequency heating roller or press having a heating tip carved with a pressing pattern which is the same with the printing pattern.

18. The method of manufacturing a down product according to claim 7, characterized in that said high-frequency bonding is carried out by using a high frequency of 7 KHz~400 KHz for 1~30 seconds.

19. The method of manufacturing a down product according to claim 7, characterized in that it further comprises the following steps:
  (6) marking and cutting,
  (7) carrying out an overlock finishing (closing of compartment openings),
  (8) introducing down into compartments and then closing the down inlet, and
  (9) combining piece parts of the product.

20. The method of manufacturing a down product according to claim 7, characterized in that a reinforced material is continuously or discontinuously intercalated between an inner fabric and an outer fabric.

21. The method of manufacturing a down product according to claim 20, characterized in that the reinforced material is selected from reinforced materials on which an adhesive is printed and dried in a predetermined pattern.

22. A double fabric for down products, comprising at least one bonding pattern line for compartment separation which is composed of an inner bonding line formed between an inner fabric and an outer fabric and a surface pattern line formed on the outer surface of the inner fabric or the outer fabric, characterized in that:

said inner bonding line is formed on the inner surfaces of the inner fabric and the outer fabric by fixing a heat-reactive adhesive on the surface of the inner or outer fabrics in a predetermined printing pattern, high-frequency heating and curing said fixed adhesive, and thus combining said fabrics with the reacted and cured adhesive, said surface pattern line is formed on the surface of the outer fabric by pressing said inner fabric and outer fabric together in a predetermined pressing pattern during the high-frequency heating to cause a difference in surface texture, the inner bonding line issued from said printing pattern and the surface pattern line issued from said pressing pattern are the same in pattern (shape) and have a width difference of 10% or less, and said surface pattern line is substantially unified with the inner bonding line by the adhesive oozed onto or near to the surface of the outer fabric and then cured.

23. The double fabric for down products according to claim 22, characterized in that a reinforced material is intercalated between an inner fabric and an outer fabric, and said reinforced material is comprised in a continuous manner between adjacent pattern bonding lines or in a discontinuous manner around pattern bonding lines.

\* \* \* \* \*